US006185503B1

(12) United States Patent
Sumizawa

(10) Patent No.: US 6,185,503 B1
(45) Date of Patent: Feb. 6, 2001

(54) NAVIGATION SYSTEM

(75) Inventor: Akio Sumizawa, Zama (JP)

(73) Assignee: Xanavi Informatics Corporation, Kanagawa (JP)

(*) Notice: Under 35 U.S.C. 154(b), the term of this patent shall be extended for 0 days.

(21) Appl. No.: 08/865,715

(22) Filed: May 30, 1997

(30) Foreign Application Priority Data

May 31, 1996 (JP) ........................................ 8-138860

(51) Int. Cl.7 ........................................ G06F 165/00

(52) U.S. Cl. ........................ 701/209; 701/117; 701/201; 701/210; 701/211; 340/988; 340/990

(58) Field of Search ........................ 701/209, 210, 701/211, 201, 117; 340/988, 990

(56) References Cited

U.S. PATENT DOCUMENTS 5,274,560 * 12/1993 LaRue ........................ 364/444
5,289,184 2/1994 Suzuki .
5,465,089 * 11/1995 Nakatami et al. ........................ 340/995
5,475,599 * 12/1995 Yokoyama et al. ........................ 364/449
5,612,882 * 3/1997 LeFebvre et al. ........................ 701/209
5,699,056 * 12/1997 Yosida ........................ 701/117
5,765,122 * 6/1998 Nagai et al. ........................ 701/208
5,793,631 * 8/1998 Ito et al. ........................ 701/210
5,852,791 * 12/1998 Sato et al. ........................ 701/217
5,948,040 * 9/1999 DeLorme et al. ........................ 701/201

FOREIGN PATENT DOCUMENTS 37 34 320 3 4/1989 (DE) .
43 22 288 9 1/1995 (DE) .
5046089 2/1993 (JP) .
6231392 8/1994 (JP) .
7085395 3/1995 (JP) .
7098797 4/1995 (JP) .

OTHER PUBLICATIONS

*Institute of Electrical and Electronics Engineers* entitled "Road–Vehicle Cooperation Driving System", pp. 425–430, Nakamura et al.

* cited by examiner

*Primary Examiner*—William A. Cuchlinski, Jr.
*Assistant Examiner*—Olga Hernandez
(74) *Attorney, Agent, or Firm*—Evenson, McKeown, Edwards & Lenahan, PLLC

(57) ABSTRACT

In a navigation system that reports on a traffic control point and a traffic jam location by voice on a route, various types of traffic information are received by an FM multiplex receiver. If the received traffic information includes information on traffic jams on the recommended route that has been set, the distance from the current position to the tail end of the traffic jam location is calculated and is reported by voice through a speaker.

19 Claims, 26 Drawing Sheets

FIG. 3

| LINK NUMBER | NUMBER OF POINTS | X,Y CORDINATES | X,Y CORDINATES | X,Y CORDINATES | X,Y CORDINATES | X,Y CORDINATES |
|---|---|---|---|---|---|---|
| 1 | 5 | X2, Y2 | X3, Y3 | X4, Y4 | X5, Y5 | X6, Y6 |
| 2 | 4 | X7, Y7 | X8, Y8 | X9, Y9 | X10, Y10 | |
| 3 | 2 | X11, Y11 | X1, Y1 | | | |
| 4 | 3 | X1, Y1 | X12, Y12 | X13, Y13 | | |
| 5 | 5 | X14, Y14 | X15, Y15 | X16, Y16 | X17, Y17 | X18, Y18 |
| ⋮ | | | | | | |
| 100 | 3 | X90, Y90 | X91, Y91 | X92, Y92 | | |

FIG. 5

RECOMMENDED ROUTE DATA TABLE

| MESH NUMBER | LINK NUMBER | DISTANCE FROM START POINT TO TAIL END OF TRAFFIC JAM | DISTANCE FROM START POINT TO FRONT END OF TRAFFIC JAM | TRAFFIC JAM CLASSIFICATION | DISTANCE FROM START POINT TO TRAFFIC CONTROL POINT | TRAFFIC CONTROL CLASSIFICATION |
|---|---|---|---|---|---|---|
| 533946 | 9 | - | - | 0 | - | 0 |
| 533946 | 10 | 50m | 150m | 3 | - | 0 |
| 533946 | 106 | - | - | 0 | - | 0 |
| 533946 | 105 | 50m | 150m | 2 | - | 0 |
| 533946 | 3 | 20m | 100m | 3 | 200m | 1 |
| 533946 | 4 | 30m | 150m | 1 | - | 0 |

FIG. 6

GUIDE POINT TABLE

| DISTANCE FROM ROUTE START POINT TO GUIDE POINT | DIRECTION OF COURSE GUIDANCE |
|---|---|
| 1000M | LEFT |
| 2000M | RIGHT |

FIG. 7

TRAFFIC JAM INFORMATION PROVISION TABLE

| NUMBER OF DATA SETS | 8 |
|---|---|

| MESH NUMBER | LINK NUMBER | DISTANCE FROM LINK START POINT TO TAIL END OF TRAFFIC JAM | DISTANCE FROM LINK START POINT TO FRONT END OF TRAFFIC JAM | TRAFFIC JAM DATA CLASSIFICATION |
|---|---|---|---|---|
| 533946 | 3 | 20m | 100m | 3 |
| 533946 | 4 | 30m | 150m | 1 |
| 533946 | 5 | 10m | 200m | 1 |
| 533946 | 6 | 0m | 250m | 1 |
| 533946 | 10 | 50m | 150m | 3 |
| 533946 | 11 | 100m | 150m | 3 |
| 533946 | 12 | 200m | 250m | 3 |
| 533946 | 105 | 50m | 150m | 2 |

FIG. 8

TRAFFIC CONTROL INFORMATION PROVISION TABLE

| NUMBER OF DATA SETS | 3 |
|---|---|

| MESH NUMBER | LINK NUMBER | DISTANCE FROM LINK START POINT TO TRAFFIC CONTROL POINT | TRAFFIC CONTROL DATA CLASSIFICATION |
|---|---|---|---|
| 533946 | 3 | 200m | 1 |
| 533946 | 101 | 100m | 2 |
| 533946 | 103 | 120m | 2 |

FIG. 9

TRAFFIC JAM / TRAFFIC CONTROL DATA TABLE

| DISTANCE FROM ROUTE POINT TO TAIL END OF TRAFFIC JAM | LENGTH OF TRAFFIC JAM | TRAFFIC JAM DATA CLASSIFICATION | DISTANCE FROM ROUTE START POINT TO TRAFFIC CONTROL POINT | TRAFFIC CONTROL DATA CLASSIFICATION |
|---|---|---|---|---|
| 550m | 150m | 3 | — | 0 |
| 1550m | 150m | 2 | — | 0 |
| 2020m | 100m | 3 | 2200m | 1 |
| 2530m | 150m | 1 | — | 0 |

CONTENTS OF VOICE REPORT ON DISTANCE TO TRAFFIC JAM AND TRAFFIC JAM LENGTH

REPORTING BY VOICE THE DISTANCE TO THE FRONT END OF THE TRAFFIC JAM

NAVIGATION SYSTEM

The disclosure of the following priority application is incorporated herein by reference: Japanese Patent Application No. 8-138860 filed May 31, 1996.

BACKGROUND OF THE INVENTION

1. Field of the Invention

The present invention relates to a navigation system that is capable of reporting traffic control information and traffic jam information transmitted from the outside of the vehicle to the driver by voice.

2. Description of the Related Art

Navigation systems that display traffic information sent through an FM multiplex broadcast wave, a light beacon or a radio wave beacon on a display screen using graphics or text are known. Also known are navigation systems which, by setting a route from the current vehicle position to a destination, provide course guidance along the course at guide points such as intersections. In such navigation systems, if there is, for instance, a location where lane traffic control is being implemented, an access ramp is closed or the traffic is jammed on the route that has been set, it is desirable to report that information promptly by voice to the driver.

SUMMARY OF THE INVENTION

It is an object of the present invention to provide a navigation system that reports on traffic control points and traffic jam locations on a route by voice.

A navigation system according to the present invention comprises a means for route setting that sets a route to a destination, a position detection device that detects a current position, a reception device that receives traffic information from outside and a reporting device that, when the traffic information received by the reception device indicates that there are a plurality of locations which may constitute a hindrance to traveling on the route that has been set, calculates the distances from the current position detected by the detection device to the locations that may constitute a hindrance and then issues a voice report on the nearest one. A location that may constitute a hindrance refers to a location where the traffic is jammed or a traffic control point. The length of the traffic jam may be reported in addition to the distance to the traffic jam location.

When there are a plurality of traffic jam locations or traffic control points, a voice report may be issued on all of them. Only traffic jam locations or traffic control points that are within a specific distance from the current position may be reported. When the reception device has received information on a traffic jam location for the first time, it is desirable to report on the distance to the traffic jam location regardless of the distance from the current position to the traffic jam location.

In addition, a navigation system according to the present invention comprises a means for route setting that sets a route to a destination, a position detection device that detects a current position, a reception device that receives traffic information from outside, a reporting device that, when the traffic information received by the reception device indicates that there is a traffic jam location on the route that has been set, calculates the distance from the current position detected by the detection device to the traffic jam location and issues a voice report, a means for prohibition that prohibits operation of the reporting device after the reporting device issues a report on the traffic jam location once until a specific change from the state that has been reported occurs. The specific change in this context refers to an instance of the distance from the current position to the tail end of the traffic jam location has been equal to or greater than a first specific value in a previous report becoming reduced to less than the first specific value. However, even when the distance to the tail end of a traffic jam location is reduced to less than the first specific value, it is desirable to prohibit another report on a traffic jam location if the difference between the previously reported distance to a traffic jam location and the newly received distance to a traffic jam location is smaller than a second specific value.

In the navigation system according to the present invention, a means for distance calculation that calculates the traveling distance starting from a point at which the reporting device reports a traffic jam location may be further provided to prohibit operation of the reporting device until the traveling distance thus calculated is equal to or greater than a specific value. In addition, in the navigation system according to the present invention, a means for time calculation that calculates the length of time elapsing from a point at which the reporting device reports a traffic jam location may be further provided to prohibit operation of the reporting device until the length of time elapsing thus calculated is equal to or greater than a specific length of time.

A navigation system according to the present invention further comprises a means for route setting that sets a route to a destination, a position detection device that detects a current position, a reception device that receives traffic information from outside and a reporting device that, when the traffic information received by the reception device indicates that a traffic control point and a traffic jam location are present on the route that has been set, does not issue a voice report on a traffic jam location that is situated beyond the traffic control point, but calculates the distance from the current position to a traffic jam location preceding the traffic control point and issues a voice report.

A navigation system according to the present invention further comprises a means for route setting that sets a route to a destination, a position detection device that detects a current position, a reception device that receives traffic information from outside and a reporting device that, when the traffic information received by the reception device indicates that a traffic control point and a traffic jam location are present on the route that has been set, calculates the distance from the current position detected by the detection device to the traffic control point and the distance from the current position to the traffic jam location and issues successive voice reports.

A navigation system according to the present invention further comprises a means for route setting that sets a route to a destination, a position detection device that detects a current position, a reception device that receives traffic information from outside and a reporting device that, when the traffic information received by the reception device indicates that there is a traffic jam location on the route that has been set, if the current position detected by the detection device is within the traffic jam location, calculates the distance from the current position to the front end of the traffic jam location and issues a voice report.

A navigation system according to the present invention further comprises a means for route setting that sets a route to a destination and course guidance to be provided at guide points, a position detection device that detects a current position, a reception device that receives traffic information from outside, an operating member that is operated in order to implement voice course guidance and a reporting device that issues the course guidance when the operating member is operated and following the course guidance thus issued, if the traffic information received by the reception device indicates that there is a traffic jam location on the route that has been set, calculates the distance from the current position detected by the detection device to the traffic jam location and issues a voice report.

A navigation system according to the present invention further comprises a means for route setting that sets a route to a destination, a position detection device that detects a current position, a reception device that receives traffic information from outside and a reporting device that, when the traffic information received by the reception device indicates that there is a traffic jam location on the route that has been set, calculates the distance from the current position detected by the detection device to the traffic jam location and issues a voice report, and once a voice report on a first traffic jam location has been issued, if a second traffic jam location occurs at a point preceding the first traffic jam location distanced by a specific distance or more from the tail end of the first traffic jam location, issues a voice report on the distance from the current position to the second traffic jam location.

According to the present invention, since, when a traffic jam location or a traffic control point is present on a recommended route, the information on the traffic jam location or the traffic control point, which is constituted of text and graphic data (the information on distance from the current position, for instance) is output by voice, the driver can ascertain the traffic jam location or the traffic control point on the recommended route without having to look at the display screen.

In addition, according to the present invention, an advantage is achieved in that a traffic jam location is reported to the driver well before the vehicle comes upon it, allowing ample time for the driver to deliberate upon whether or not it is preferable to make a detour and to choose a detour route well in advance.

BRIEF DESCRIPTION OF THE DRAWINGS

FIG. 3 is a diagram illustrating a road map data table.

FIG. 5 is a diagram illustrating a recommended route data table.

FIG. 6 is a diagram illustrating a guide point table.

FIG. 7 is a diagram illustrating a traffic jam information provision data table.

FIG. 8 is a diagram illustrating a traffic control information provision data table.

FIG. 9 is a diagram illustrating a traffic jam/traffic control information data table.

DESCRIPTION OF THE PREFERRED EMBODIMENTS

Figure 1:
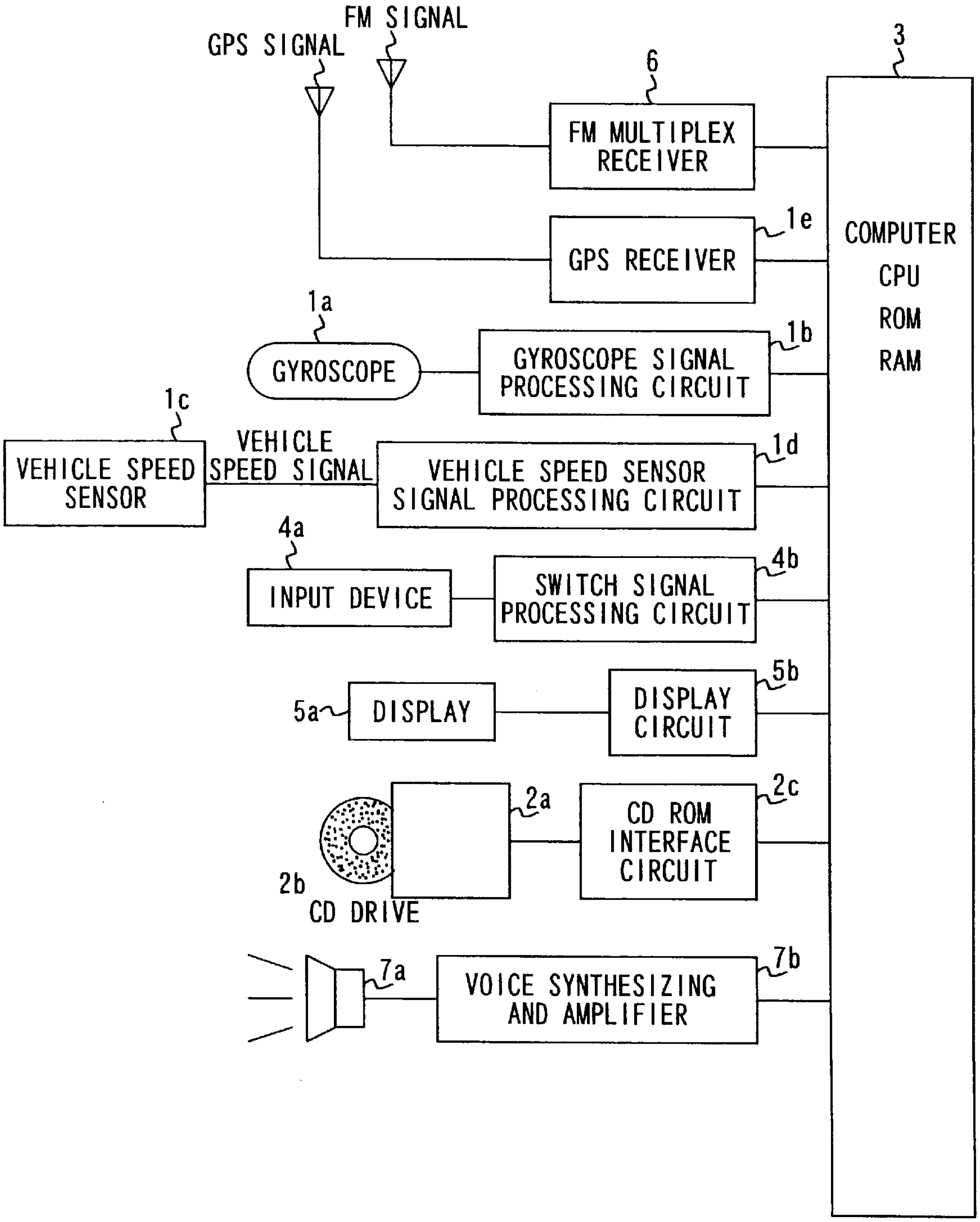
FIG. 1 is a block diagram showing an embodiment of the navigation system according to the present invention.

FIG. 1 is a block diagram of an embodiment of the navigation system according to the present invention. The navigation system is provided with a current position detection device that detects the current position of the vehicle and, in this example, the current position detection device is constituted with a gyroscope 1*a* that detects a traveling direction of the vehicle, a signal processing circuit 1*b* that processes signals from the gyroscope 1*a*, a vehicle speed sensor 1*c* that outputs a vehicle speed signal that corresponds to the vehicle speed, a signal processing circuit 1*d* that processes a signal from the vehicle speed sensor 1*c* and a GPS receiver 1*e* that receives a GPS signal from a GPS (Global Positioning System) satellite. Reference number 2*a* indicates a CD ROM drive that reads planar road map data that are stored in a CD ROM 2*b* and reference number 2*c* indicates a CD ROM interface circuit.

Reference number 3 indicates a computer that controls the overall operation of the apparatus, comprising a CPU, RAM, ROM and other peripheral circuits. In the RAM, data for planar road map drawing data, image data for display at a display 5*a* and various types of data tables for displaying and outputting by voice received traffic information are stored. The data for map drawing are created based upon 2-dimensional road map data that are read out from the CD ROM 2*b* and the image data are created from data for planar map drawing and graphic data representing various types of traffic information. The image data are read out as necessary and displayed on the display 5*a*. In addition, the data tables are created based upon received traffic information. Reference number 4*a* indicates an input device provided with various switches and reference number 4*b* indicates a signal processing circuit that processes switch signals from the input switches 4*a*. The input device 4*a* is provided with a voice request switch and other various switches. It is to be noted that the display 5*a* is connected to and controlled by a display circuit 5*b* and that various types of touch panel switches are arranged on the display screen of the display 5*a*.

Reference number 6 indicates an FM multiplex receiver that receives traffic information through FM multiplex broadcast waves (hereafter referred to as VICS information). The VICS information explained in this specification includes traffic jam information and traffic control information. The traffic jam information is classified into four types, i.e., jammed (traffic jam data classification 3), congested (2), no jam or congestion with traffic flowing smoothly (traffic jam data classification 1) and unknown (traffic jam data classification 0), and these traffic states, i.e., jammed, congested, and flowing smoothly are respectively displayed in red, yellow and green with a road divided into lanes going in both directions. The traffic control information includes road block information (traffic control data classification 1), ramp closure information on access ramps of a highway (traffic control data classification 2) and no traffic control (traffic control data classification 0). It may include lane traffic control information as well. Such VICS information is constituted of the distance from link start points to the tail end of a traffic jam, the distance from the link start point to the front end of the traffic jam, the traffic jam data classification, the distance from the link start point to a traffic control point, the traffic control data classification and the like in correspondence to mesh numbers and link numbers that constitute a road map data.

Reference number 7*a* indicates a speaker for issuing a voice report of the distance to the traffic jam location and the distance to the traffic control point, whereas reference number 7*b* indicates a voice synthesizing circuit and an amplifier.

Figure 2:
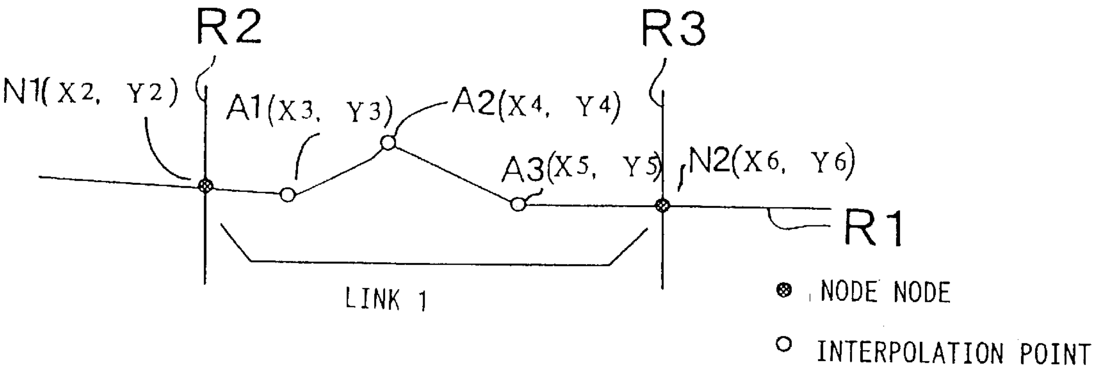
FIG. 2 is a diagram illustrating road map data.

FIGS. 2 and 3 illustrate the road map data. In FIG. 2, a road R1 intersects two roads R2 and R3. The intersection of the road R1 and the road R2 is referred to as a node N1 and the intersection of the road R1 and the road R3 is referred to as a node N2, with the section having the nodes N1 and N2 as its start point and end point respectively referred to as a link 1. Interpolation points A1–A3 are provided between the node N1 and the node N2. The nodes N1 and N2 and the interpolation points A1–A3 respectively are provided with coordinate position data (X2, Y2)–(X6, Y6), distance data on the distances between the individual points, link length data and the like. A road map is divided into a plurality of areas and each divided area is defined by an inherent mesh number. Thus, if the road R1 inside a divided map area defined by a specific mesh number (533946, for instance) is constituted of 100 links, the road R1 is defined as shown in FIG. 3, by link numbers 1–100, the number of points of nodes and interpolation points constituting each link and the X, Y coordinates of each point. In other words, FIG. 3 shows a road data table for one mesh. It is to be noted that link numbers and node numbers are assigned in each mesh area from 1-a specific number.

Figure 4:
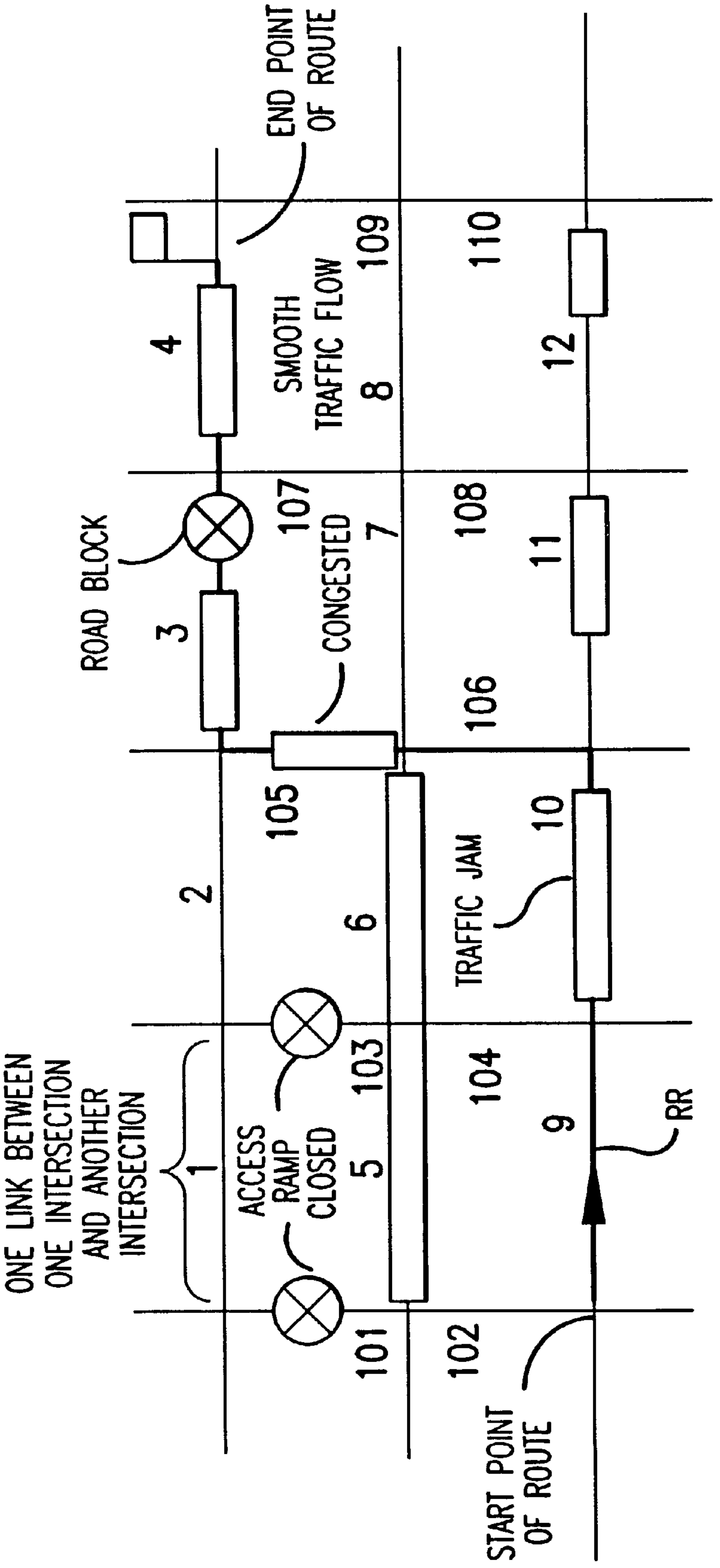
FIG. 4 is a diagram illustrating specific examples of recommended route, traffic jam information and traffic control information.

FIG. 4 shows a recommended route RR having a start point and an end point set within the same mesh indicated by bold lines with both traffic jam locations and traffic control points as received by the FM multiplex receiver 6. The figure shows a situation in which the recommended route RR is set in the order of link numbers 9, 10, 106, 105, 3 and 4 with traffic jam locations present at link numbers 10 and 3, a congested location present at link number 105 and a smooth traffic flow location present at link number 4. It also shows that there is a road block at link number 3. There are traffic jam locations and traffic control points at links that are not on the recommended route. The individual tables, which are to be explained below, are prepared based upon this illustrated example.

FIGS. 11–19 are flowcharts illustrating various types of processing performed by the computer 3, and the operation of this embodiment is explained in reference to these flowcharts. It is to be noted that the computer 3 executes the program illustrated by the flowcharts in FIGS. 11–19 when the key is operated to the ignition ON position.

Figure 11:
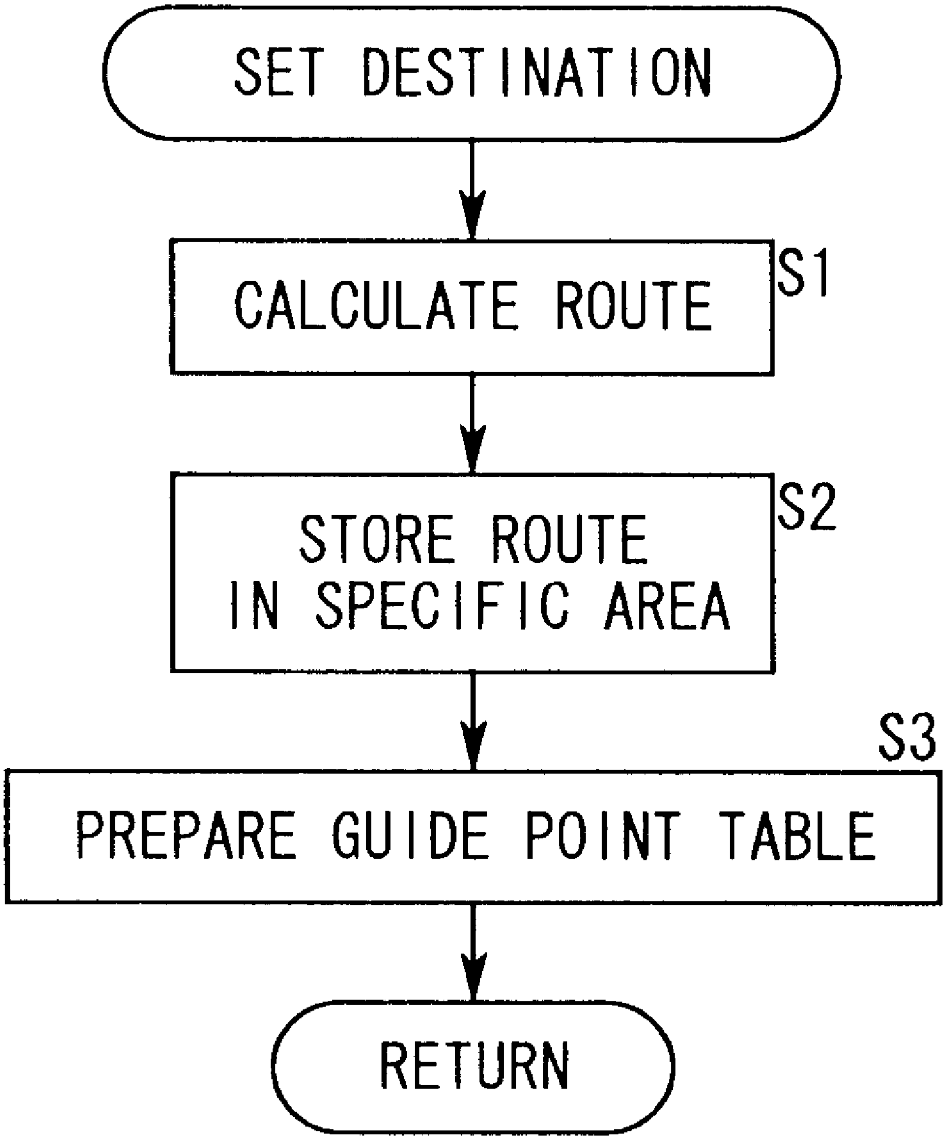
FIG. 11 is a flowchart illustrating the recommended route setting processing.

FIG. 11 is a flowchart of the processing in which a recommended route is set in conformance to an input destination. In step S1, the recommended route from the current position to the destination is calculated and set. The destination is set by the operator via the input device 4 and the recommended route is set automatically through calculations employing a method in the known art such as the Dykstra method. In this processing, the position detected by the current position detection device can be used as the current position. Or, with candidates for a recommended route stored in memory in advance in a ROM or the like, one of these may be selected as a recommended route. In step S2, data of the recommended route are stored in a specific area of the RAM in the computer 3 and a recommended route data table is created. In step S3, data on course guidance at guide points on the recommended route are stored in RAM at the computer 3 and a guide point table is created.

FIG. 5 shows an example of a recommended route data table. The recommended route data table is basically constituted with mesh numbers and link numbers stored sequentially, starting from the current position toward the destination. For instance, in FIG. 5, the recommended route is indicated by link number 9, link number 10, link number 106 . . . link number 4 within one mesh area. In correspondence to the individual link numbers, data on the distance from the link start point to the tail end of a traffic jam location, data on the distance from the link start point to the front end of a traffic jam location, the traffic jam data classification, the distance from the start point to the traffic control point and the traffic control data classification are stored.

FIG. 6 shows an example of a guide point table. The guide point table is constituted of data on the distance from start point of the recommended route to guide points and data on directions for providing course guidance at each guide point.

Figure 12:
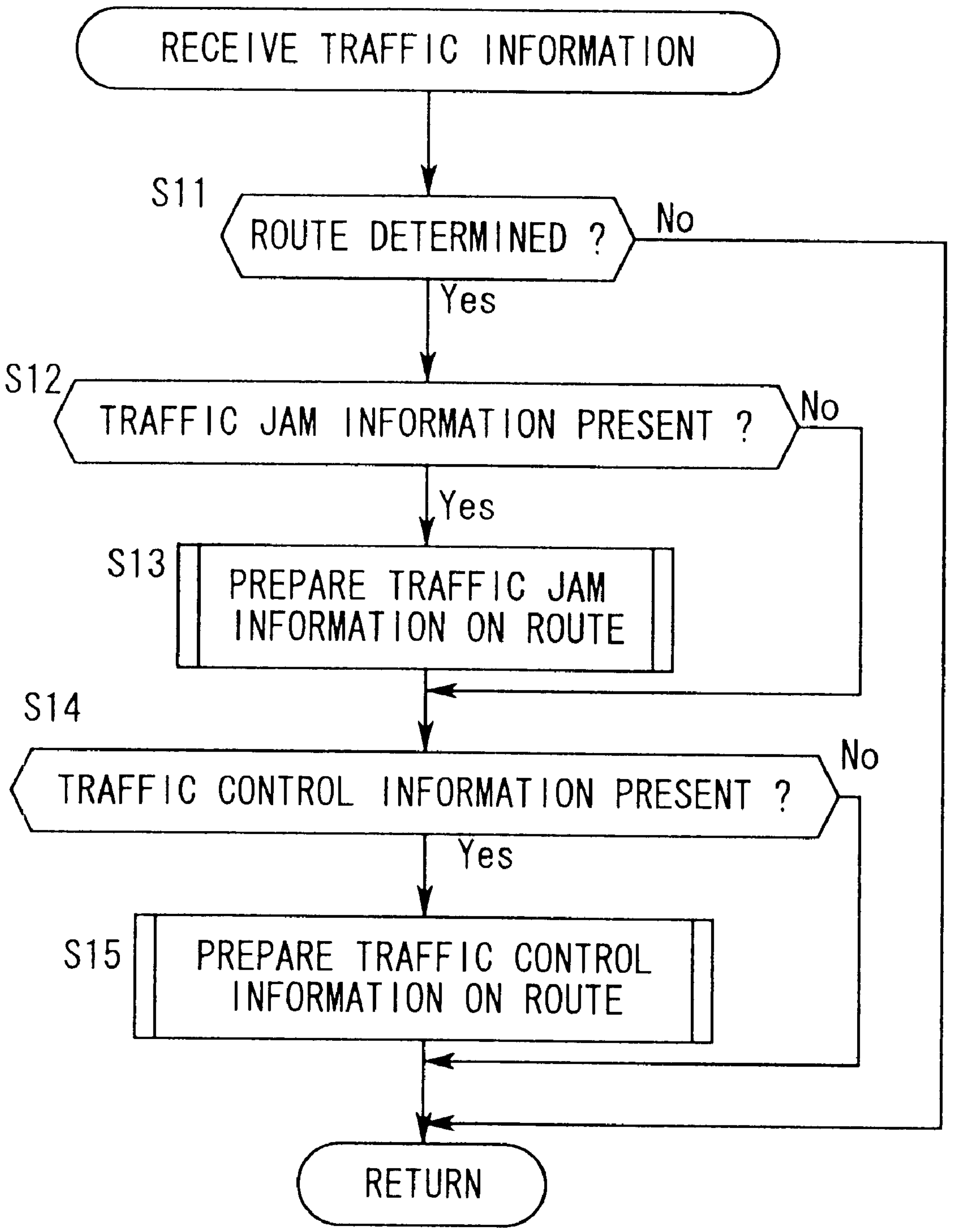
FIG. 12 is a flowchart illustrating the traffic information reception processing.

FIG. 12 is a flowchart illustrating the traffic information reception processing. First, the traffic information data received by the FM multiplex broadcast receiver 6 are explained. FIG. 7 shows an example of the traffic jam information provision table, and in correspondence to the individual link numbers combined with a mesh number, the distance from link start points to the tail end of the traffic jam location, the distance from a link start point to the front end of the traffic jam location and the traffic jam data classification are stored. In addition, the number of sets of data is also stored.

FIG. 8 shows an example of the traffic control information provision table, and in correspondence to the individual link numbers in combination with a mesh number, the distance from link start points to the traffic control point and the traffic control data classification are stored. In addition, the number of sets of data is also stored.

In reference to FIG. 12, if it is decided in step S11, that a recommended route has been set, the operation proceeds to step S12, in which a decision is made as to whether or not the traffic information that has been received includes traffic jam information. If an affirmative decision is made in step S12, the traffic jam information is stored in the recommended route data table in step S13. Step S13 is to be explained later in further detail in reference to FIG. 13. In step S14, a decision is made as to whether or not the received traffic information includes traffic control information. If an affirmative decision is made in step S14, the traffic control information is stored in the recommended route data table in step S15. Step S15 is to be explained later in further detail in reference to FIG. 14. It is to be noted that if a recommended route has not been set, a negative decision is made in step S11, whereas if no traffic jam information is present, a negative decision is made in step S12 and if no traffic control information is present, a negative decision is made in step S15.

Figure 13:
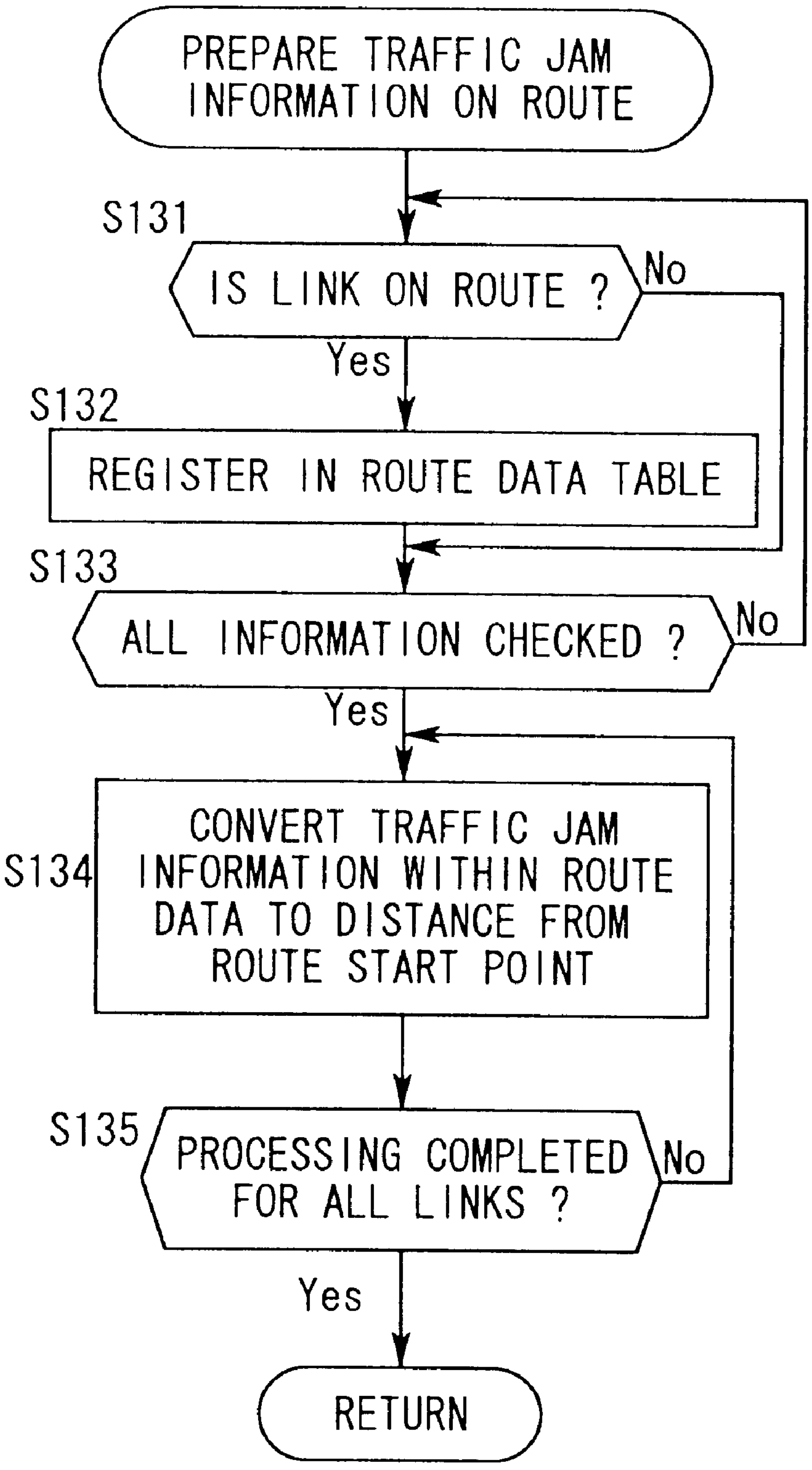
FIG. 13 is a flowchart illustrating the processing through which traffic jam information is registered in the recommended route data table.

FIG. 13 is a detailed flowchart of the processing in which the traffic jam information with respect to traffic jams on the recommended route is registered in step S13 in FIG. 12.

In step S131 a decision is made as to whether or not the link number with the traffic jam data classification that has been received is a link number on the recommended route. If an affirmative decision is made, the operation proceeds to step S132, in which, in correspondence to the relevant mesh number and the relevant link number, the distance from the link start point to the tail end of the traffic jam, the distance from the link start point to the front end of the traffic jam and the traffic jam data classification are stored. If a negative decision is made in step S131, the operation skips step 132. In step 133, a decision is made as to whether or not the processing described above has been completed for all the traffic jam information that has been received, and if the entire information has been checked, the operation proceeds to step S134. In step S134, the distances from each link start point to the tail end and to the front end of a traffic jam are each converted to a distance from the start point of the recommended route. If it is decided that the conversion processing is completed for all the links in step S135, this processing ends.

The recommended route data table shown in FIG. 5 is a table resulting from this processing. It indicates that, for instance, the traffic jam information is unknown and no traffic control is being implemented for link number 9, that a traffic jam location is present but no traffic control is being implemented for link number 10, that there is a congested location but no traffic control point is present for link number 105, that a traffic jam location is present and that a road block traffic control is also being implemented for link number 3 and that traffic is flowing smoothly and no traffic control is being implemented for link number 4.

Figure 14:
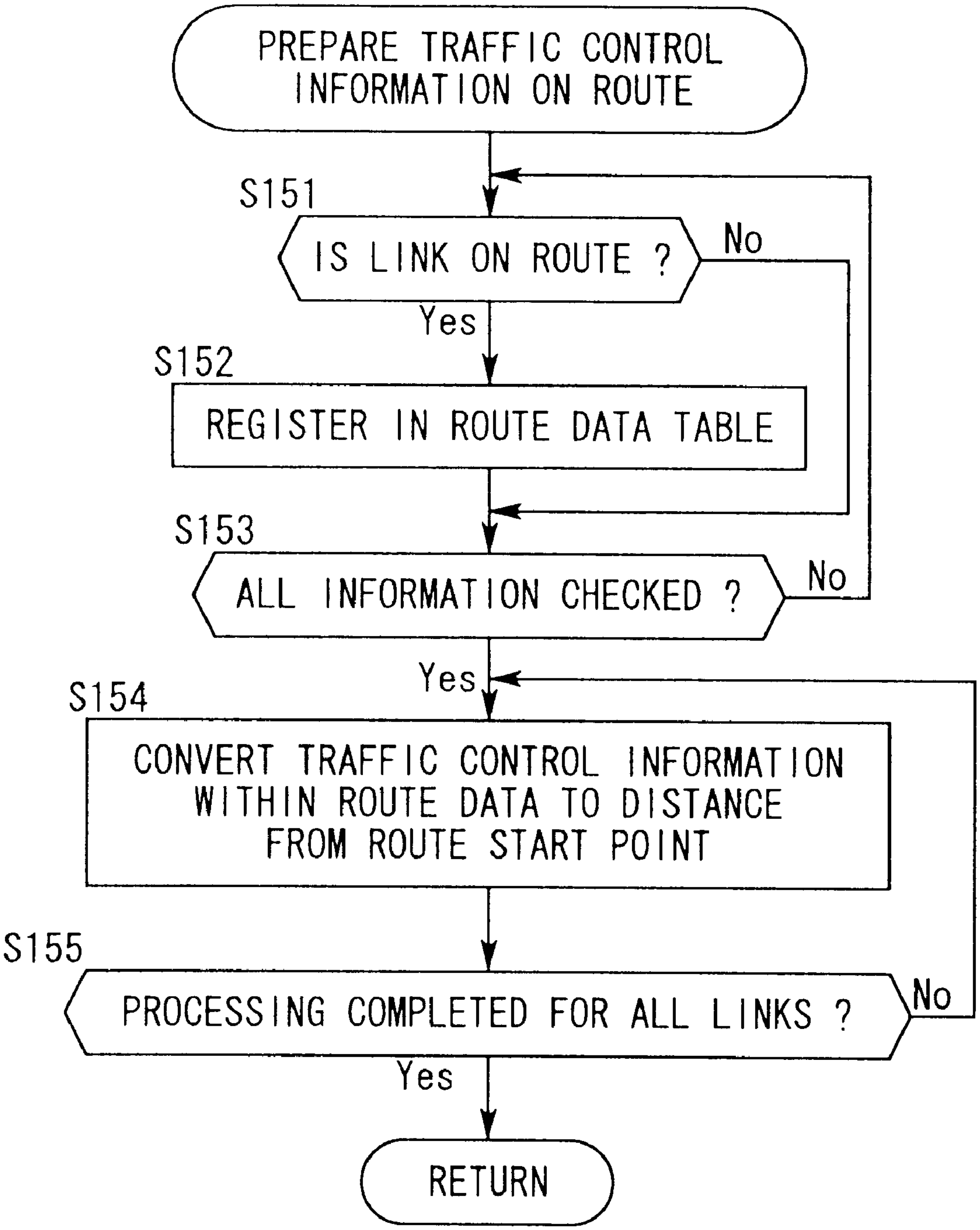
FIG. 14 is a flowchart illustrating the processing through which traffic control information is registered in the recommended route data table.

FIG. 14 is a detailed flowchart of the processing in which the traffic control information with respect to traffic control being implemented on the recommended route is registered in step S15, as shown in FIG. 12.

In step S151, a decision is made as to whether or not the link number with the traffic control data classification that has been received is a link number on the recommended route. If an affirmative decision is made, the operation proceeds to step S152, in which, in correspondence to the relevant mesh number and the relevant link number, the distance from the link start point to the traffic control point and the traffic control data classification are stored. If a negative decision is made in step S151, the operation skips step S152. In step S153, a decision is made as to whether or not the processing described above has been completed for all the traffic control information that has been received, and if a check on the entire information has been completed, the operation proceeds to step S154, in which the distance from each link start point to the traffic control point is converted to a distance from the start point of the recommended route. This processing ends if, in step S155 it is decided that the conversion processing has been completed for all the links.

FIG. 9 shows an example of a traffic jam/traffic control data table in which the distance from the start point of the recommended route to the tail end of the traffic jam location, the length of the traffic jam, the traffic jam data classification, the distance from the start point of the recommended route to the traffic control point and the traffic control data classification are stored. The distance from the start point of the recommended route to the tail end of a traffic jam location can be calculated based upon the data on the lengths of the individual links constituting the recommended route and the distance from the start point of the link where the traffic jam location is situated and the tail end of the traffic jam. In addition, the length of the traffic jam can be calculated based upon the distance from the link start point to the tail end of the traffic jam and the distance from the link start point to the front end. The distance from the start point of the recommended route to a traffic control point can be determined in a similar manner.

Figure 10:
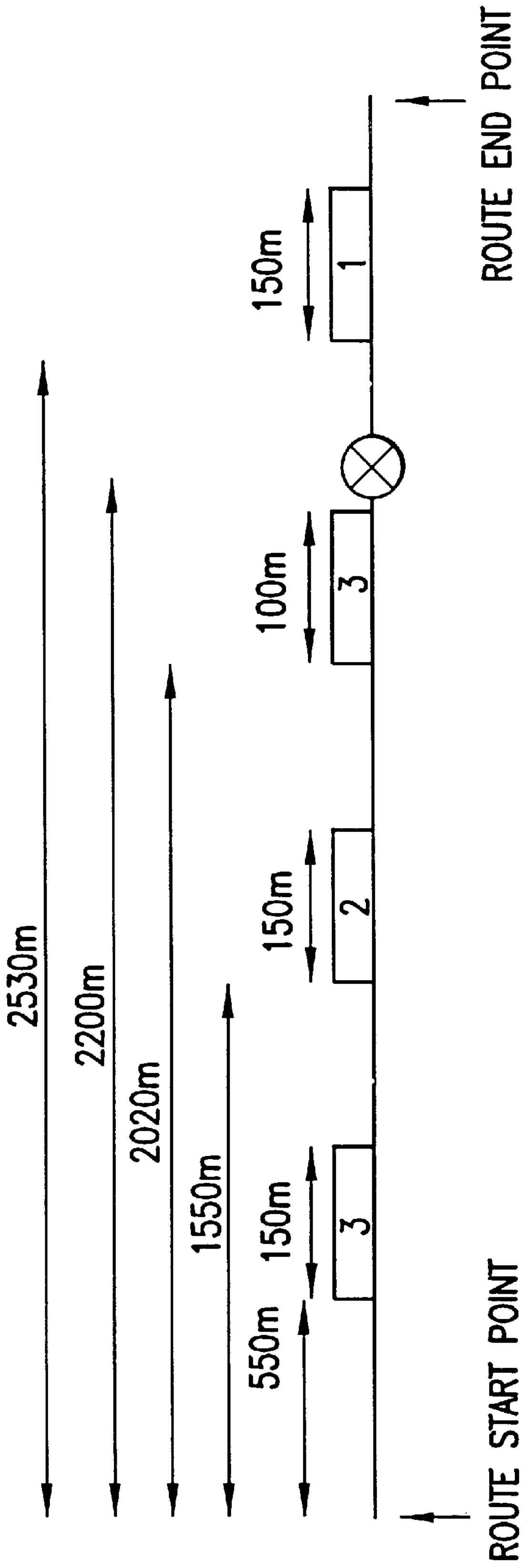
FIG. 10 is a diagram illustrating the distances from the start point of the recommended route to traffic jam locations and traffic control points.

FIG. 10 shows specific details of the traffic jam/traffic control data table shown in FIG. 9, indicating the distances from the start point of the recommended route to the tail end of the traffic jam location and the distance to the traffic control point as well as the length of the traffic jam.

Figure 15:
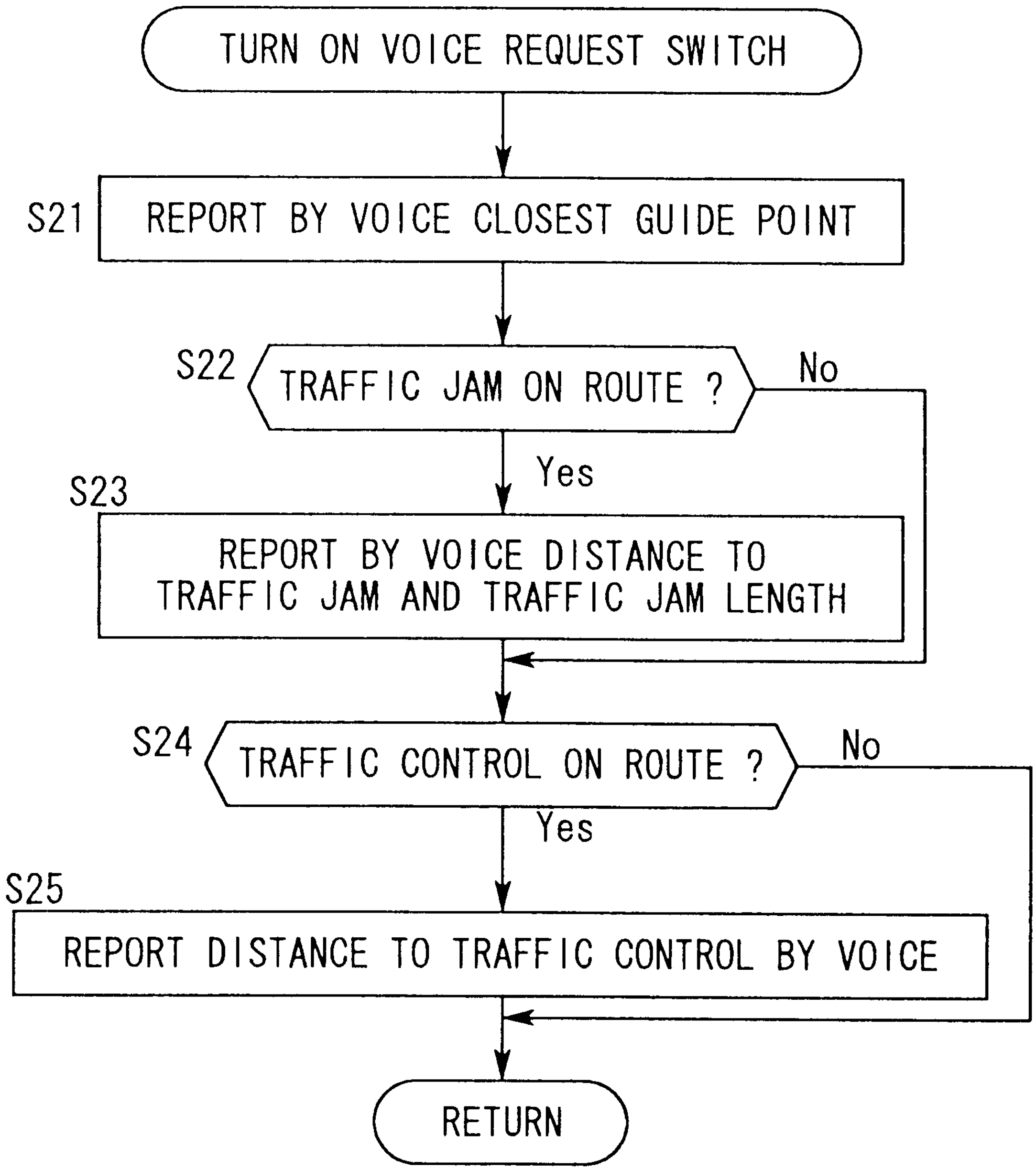
FIG. 15 is a flowchart illustrating the processing performed when the voice request switch is operated.

FIG. 15 is a flowchart of the processing performed when the voice request switch is operated. When the voice request switch is operated, the guide point table shown in FIG. 6 is searched and the course guidance direction at the guide point that is nearest the current position is output from the speaker 7*b* via the voice synthesizing circuit and amplifier 7*a* in step S21. If it is decided that there is a traffic jam location on the recommended route in step S22, the operation proceeds to step S23, in which the distance from the current position to the tail end of the traffic jam and the length of the traffic jam are output by voice. If it is decided that there is a traffic control point on the recommended route in step S24, the operation proceeds to step S25, in which the distance from the current position to the traffic control point is output by voice. If there is no traffic jam location or traffic control point, negative decisions are made in steps S22 and S24 and no voice output is performed.

Figure 16:
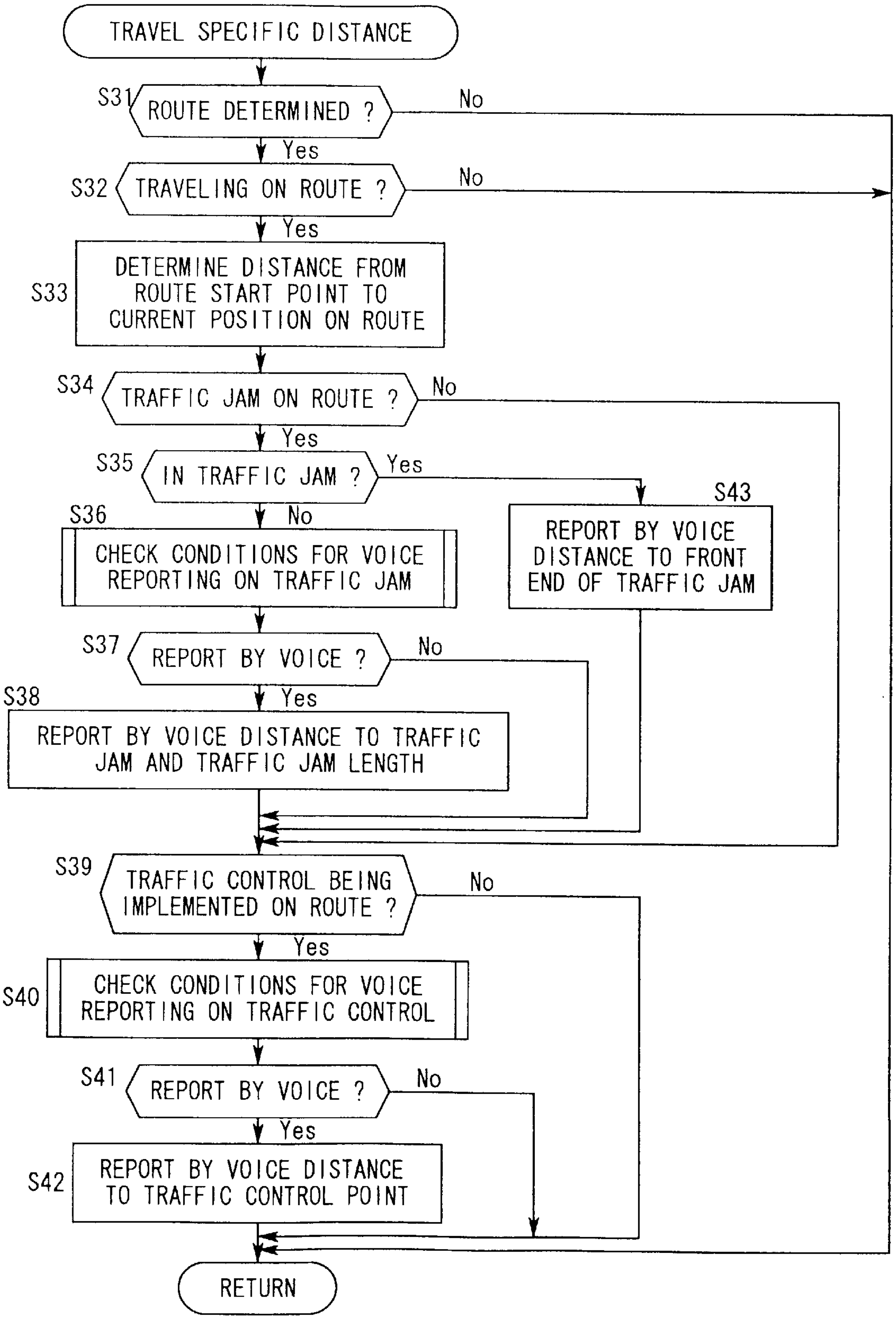
FIG. 16 is a flowchart illustrating the voice output processing which is executed each time the vehicle has traveled a specific distance.

FIG. 16 is a flowchart of the processing that is performed for each specific traveling distance, i.e., every 10 m, for instance. If it is decided in step S31 that a recommended route has been set, a decision is made in step S32 as to whether or not the vehicle is traveling on the recommended route that has been set. If it is traveling on the recommended route, the distance from the start point of the recommended route to the current position on the recommended route is calculated in step S33. If it is decided in step S34 that there is a traffic jam location on the recommended route, a decision is made as to whether or not the current position is within the traffic jam location in step S35. If the current position is not within the traffic jam location, the conditions for issuing a voice report on the traffic jam are checked in step S36. This check will be explained in detail later in reference to FIGS. 17A and 17B. If the current position is within the traffic jam location, the distance from the current position to the front end of the traffic jam is reported by voice in step S43.

Figure 17A:
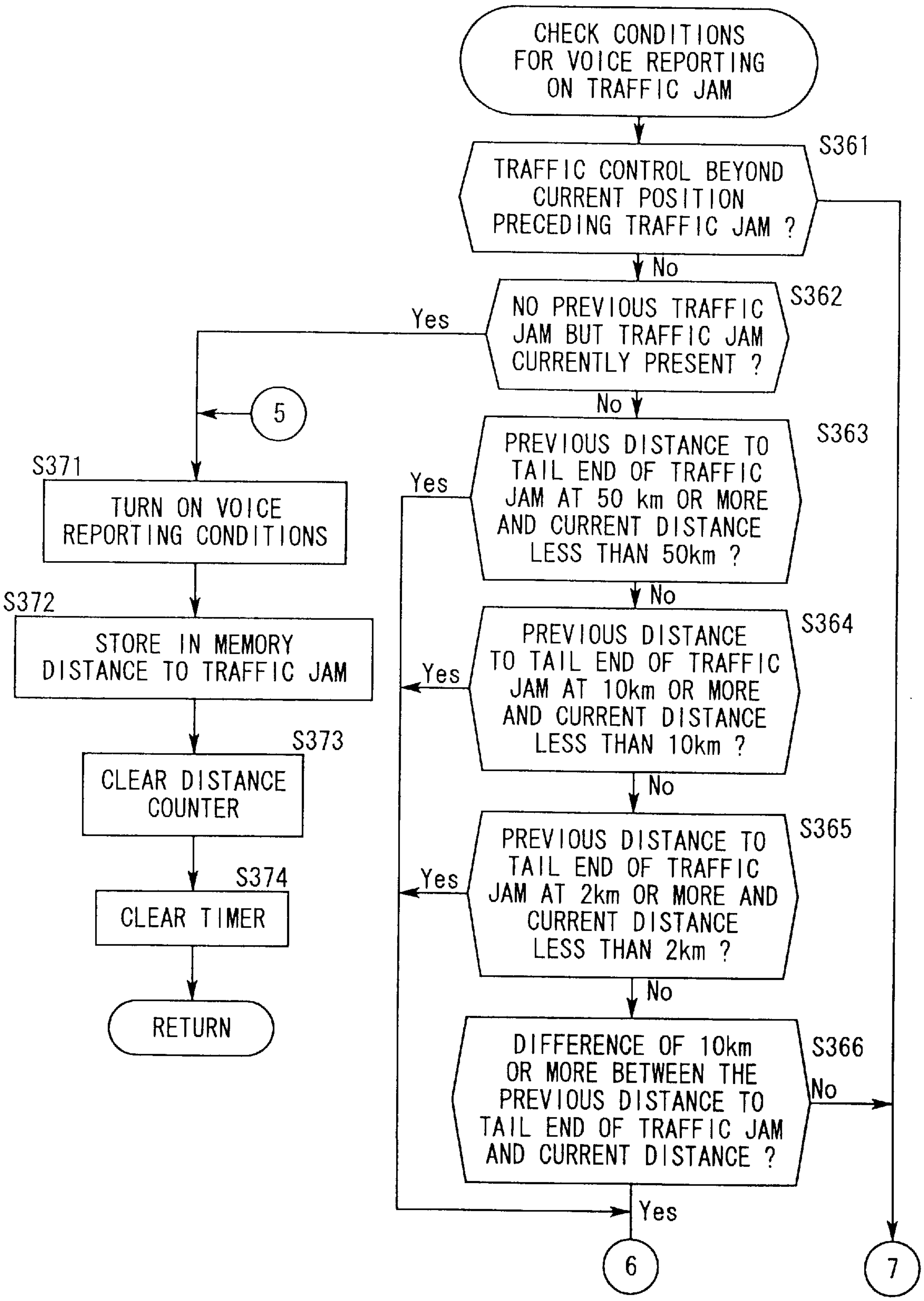
FIG. 17A and 17B are flowcharts illustrating the processing through which the conditions for voice reporting on traffic jam information are checked.
Figure 17B:
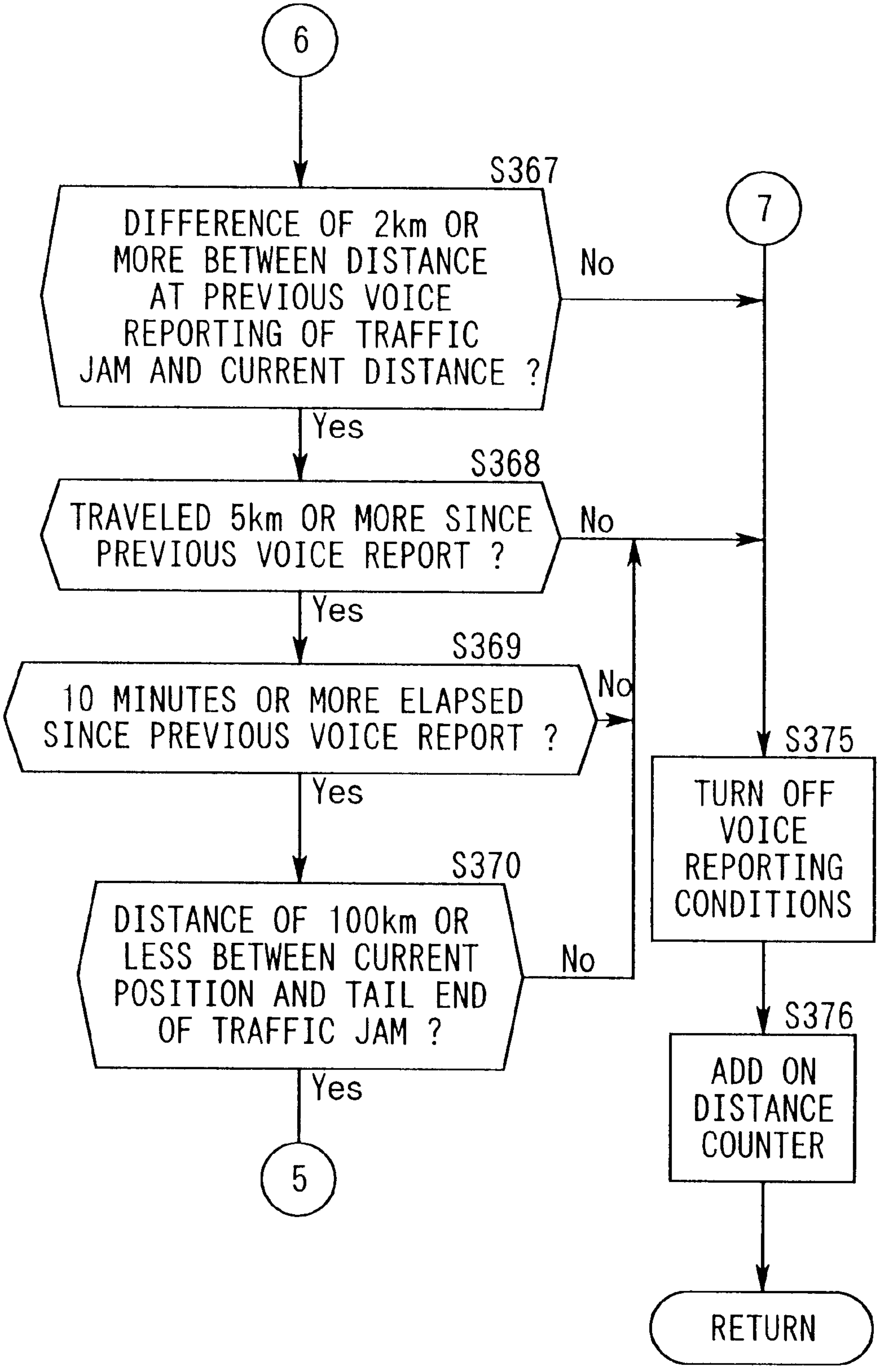

When the operation proceeds to step S37, a decision is made as to whether or not a voice report flag, which is turned on/off through the condition check processing for voice reporting on a traffic jam shown in FIGS. 17A and 17B, is on. In other words, even when a traffic jam location is on the recommended route, there are circumstances in which voice output may become irritating and is, therefore, prohibited under specific conditions. The voice report flag is turned off when voice output is prohibited and the voice report flag is turned on when voice output is allowed.

If the voice report flag is on in step S37, the distance from the current position to the tail end of the traffic jam location and the length of the traffic jam are reported by voice in step S38. Then, if it is decided that there is a traffic control point on the recommended route in step S39, the conditions for issuing a voice report on the traffic control point are checked in step S40. This check will be explained in further detail later in reference to FIGS. 18A and 18B.

Figure 18A:
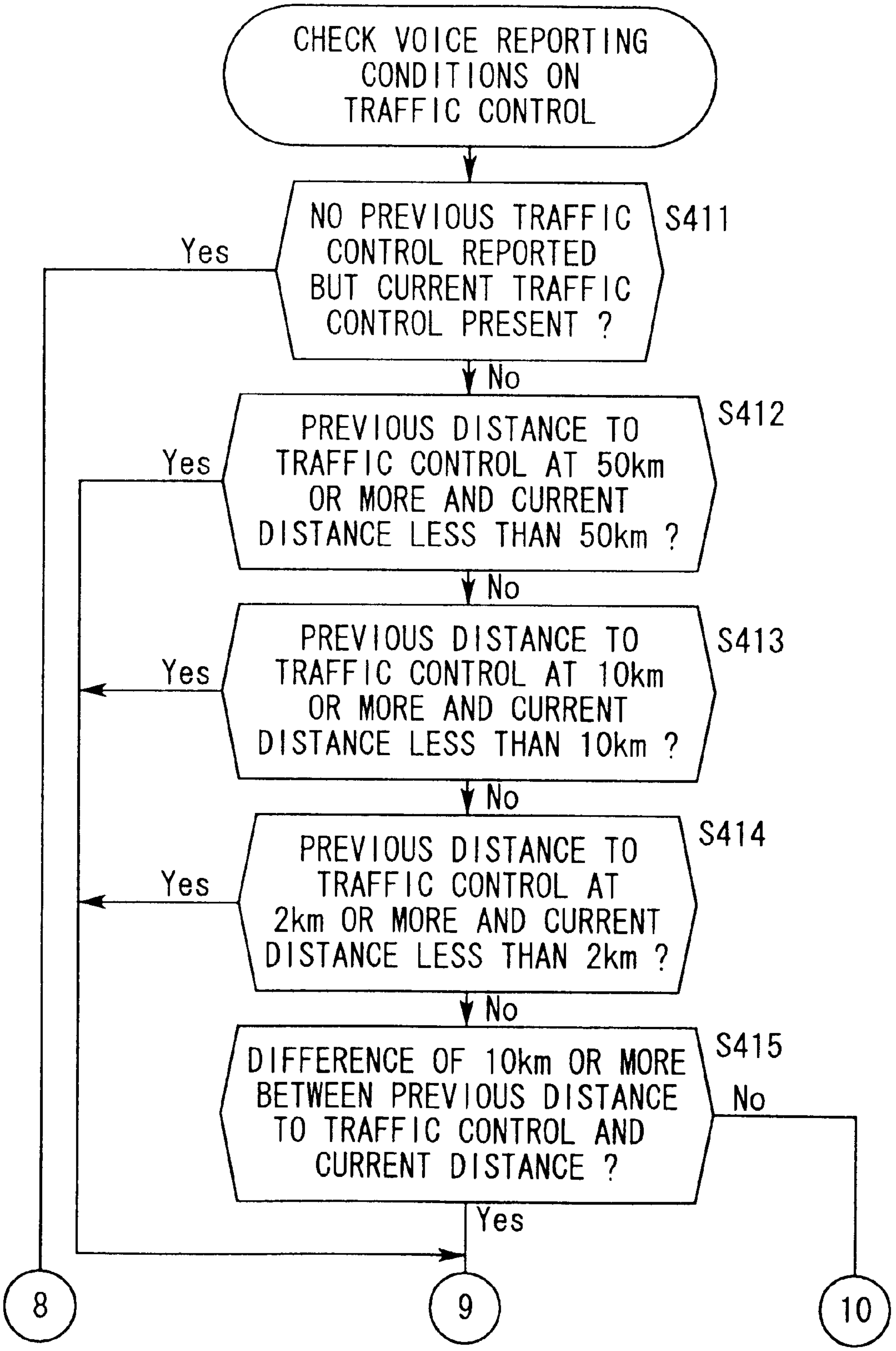
FIG. 18A and 18B are flowcharts illustrating the processing through which the conditions for voice reporting on traffic control information are checked.
Figure 18B:
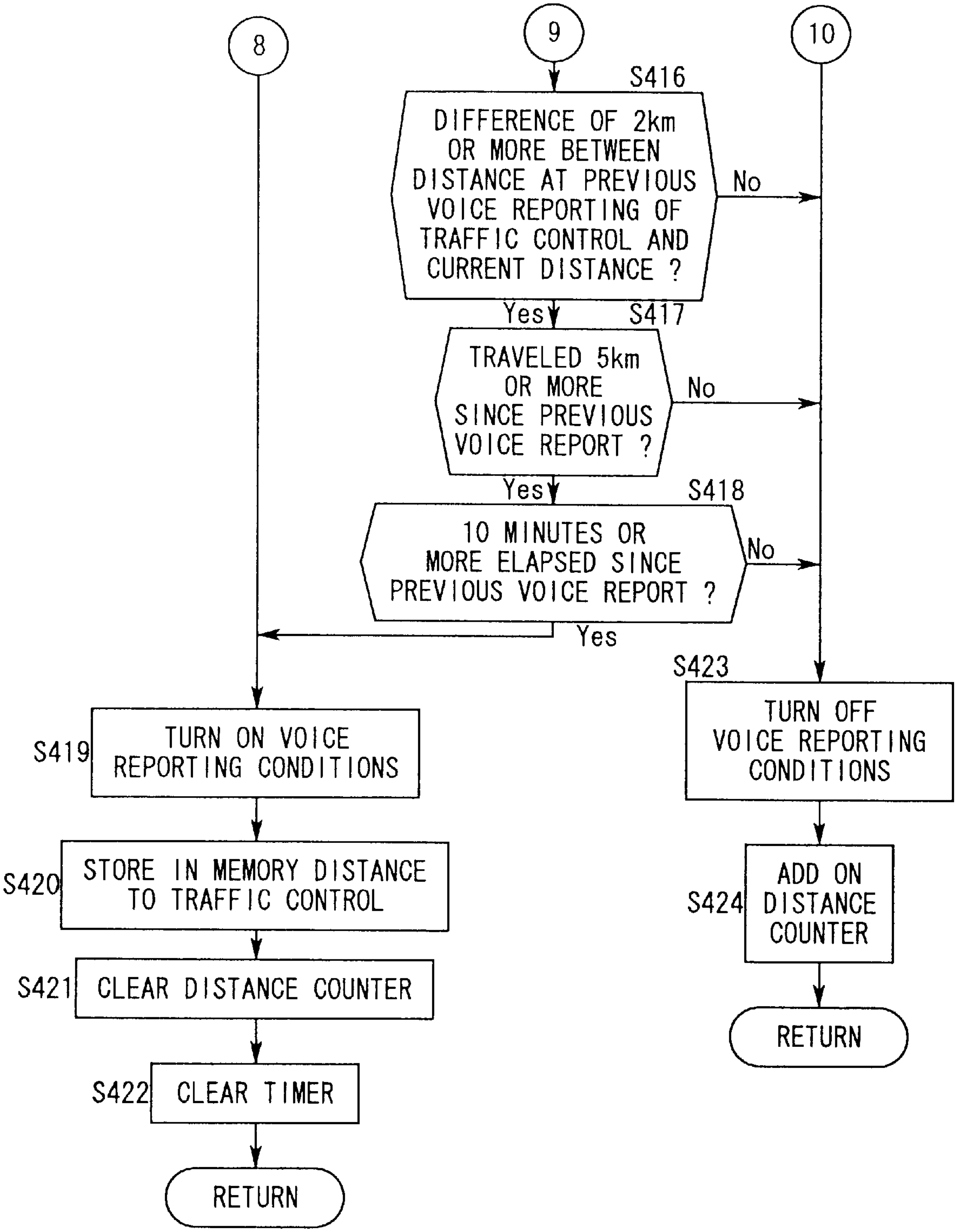

When the operation proceeds to step S41, a decision is made as to whether or not the voice report flag, which is turned on/off through the condition check processing for voice reporting on a traffic control point shown in FIGS. 18A and 18B, is on. In other words, even when a traffic control point is on the recommended route, there are circumstances in which voice output may become irritating and is, therefore, prohibited under specific conditions. The voice report flag is turned off when voice output is prohibited and the voice report flag is turned on when voice output is allowed. If the voice report flag is on in step S41, the distance from the current position to the traffic control point is reported by voice in step S42. In regard to traffic control points, even when there are a plurality of traffic control points, only the distance from the current position to the nearest traffic control point is reported by voice output.

FIGS. 17A and 17B are flowcharts that illustrate the condition check processing for voice reporting on traffic jam locations in further detail. If it is decided in step S361 that a traffic control point is present preceding a traffic jam location that is ahead of the current position, the voice report flag is turned off in step S375, and in step S376, a specific value is added to a distance counter. This distance counter measures the distance traveled from the point in time at which a voice output is first performed for a traffic jam location up to the present time.

If a negative decision is made in step S361, the operation proceeds to step S362, in which a decision is made as to whether or not the information on a traffic jam location on the recommended route has been received for the first time. If the information has been received for the first time, the voice report flag is turned on in step S371, and in step S372, the distance from the current position to the tail end of the traffic jam location is stored in memory. Then, in step S373, the distance counter is cleared and in step S374, the timer is cleared. This timer counts the length of time elapsing from the point at which a voice output on a traffic jam location is issued for the first time up to the current time.

If a negative decision is made in step S362, a decision is made in step S363 as to whether or not the previous distance to the tail end of the traffic jam was equal to or greater than 50 km and the current distance is less than 50 km, and if a negative decision is made in step S363, the operation proceeds to step S364. In step S364, a decision is made as to whether or not the previous distance to the tail end of the traffic jam was equal to or greater than 10 km and the current distance is less than 10 km. If a negative decision is made in step S364, a decision is made in step S365 as to whether or not the previous distance to the tail end of the traffic jam was equal to or greater than 2 km and the current distance is less than 2 km. If a negative decision is made in step S365, a decision is made in step S366 as to whether or not there is a difference of 10 km or more between the distance to the tail end of the previously reported traffic jam location and the distance to the tail end of a traffic jam location that has occurred at a point close to the vehicle position and has been newly detected in step S34.

If affirmative decisions are made in steps S363–366, the operation proceeds to step S367, in which a decision is made as to whether or not there is a difference of 2 km or more between the previously reported distance to the tail end of the traffic jam location and the newly calculated distance to the tail end of the same traffic jam location. If a negative decision is made in step S367, the voice report flag is turned off in step S375. If, on the other hand, an affirmative decision is made in step S367, the operation proceeds to step S368, in which a decision is made as to whether or not the vehicle has traveled 5 km or more from the point at which the previous voice report was issued. If a negative decision is made, the voice report flag is turned off in step S375. If, on the other hand, an affirmative decision is made in step S368, the operation proceeds to step S369, in which a decision is made as to whether or not 10 minutes or more have elapsed since the point in time at which the previous voice report was issued. If a negative decision is made, the voice report flag is turned off in step S375, whereas if an affirmative decision is made in step S369, the operation proceeds to step S370, in which a decision is made as to whether or not the distance from the current position to the tail end of the traffic jam is at or less than 100 km, and if a negative decision is made, the voice report flag is turned off in step S375. If an affirmative decision is made in step S370, the operation proceeds to step S371. The processing from step S367 through step S370 described above is performed to ensure that voice output is not performed indiscriminately since, if voice reporting is performed too frequently, it can become irritating.

FIGS. 18A and 18B is flowcharts that illustrate the condition check processing for voice reporting on traffic control points in further detail. In step S411, a decision is made as to whether or not information on a traffic control point on the recommended route has been received for the first time. If the information has been received for the first time, the voice report flag is turned on in step S419, and in step S420, the distance to the traffic control point is stored in memory. Then, in step S421, the distance counter is cleared and in step S422, the timer is cleared.

If a negative decision is made in step S411, a decision is made in step S412 as to whether or not the previous distance to the traffic control point was equal to or greater than 50 km and the current distance is less than 50 km, and if a negative decision is made in step S412, the operation proceeds to step S412. In step S413, a decision is made as to whether or not the previous distance to the traffic control point was equal to or greater than 10 km and the current distance is less than 10 km. If a negative decision is made in step S413, a decision is made in step S414 as to whether or not the previous distance to the traffic control point was equal to or greater than 2 km and the current distance is less than 2 km. If a negative decision is made in step S414, a decision is made in step S415 as to whether or not there is a difference of 10 km or more between the previous distance to the traffic control point and the current distance to the traffic control point.

If affirmative decisions are made in steps S412–415, the operation proceeds to step S416, in which a decision is made as to whether or not there is a difference of 2 km or more between the previous distance to the traffic control point and the current distance to the traffic control point. If a negative decision is made in step S416, the voice report flag is turned off in step S423, and a specific value is added onto the distance counter in step S424.

If an affirmative decision is made in step S416, the operation proceeds to step S417, in which a decision is made as to whether or not the vehicle has traveled 5 km or more from the point at which the previous voice report was issued. If a negative decision is made, the voice report flag is turned off in step S423. If, on the other hand, an affirmative decision is made in step S417, the operation proceeds to step S418, in which a decision is made as to whether or not 10 minutes or more have elapsed since the point in time at which the previous voice report was issued. If a negative decision is made, the voice report flag is turned off in step S423. If an affirmative decision is made in step S418, the operation proceeds to step S419.

Figure 19:
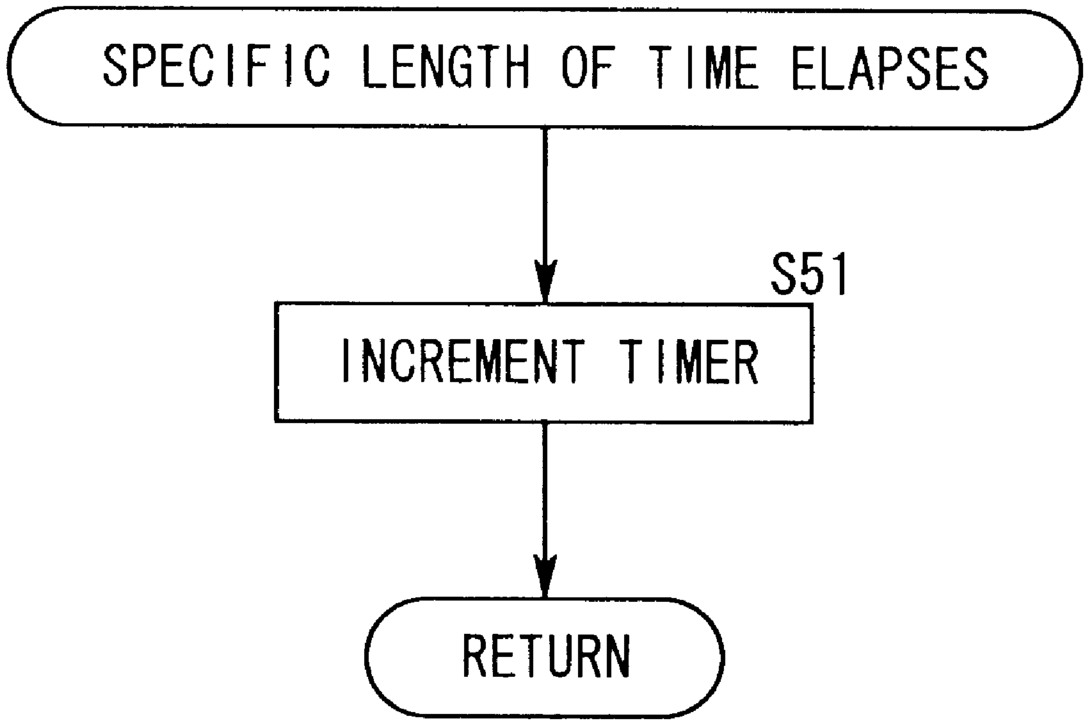
FIG. 19 is a flowchart of the time counting processing for interrupts over specific intervals.

FIG. 19 is a flowchart showing the interrupt processing that is performed over specific time intervals. In step S51, the timer counter is incremented by a specific value.

Figure 20A:
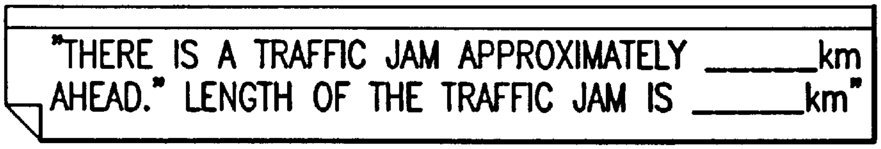
FIG. 20A–20E illustrate the contents of voice reports.
Figure 20B:
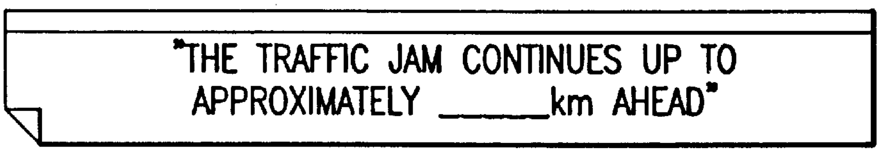
Figure 20C:
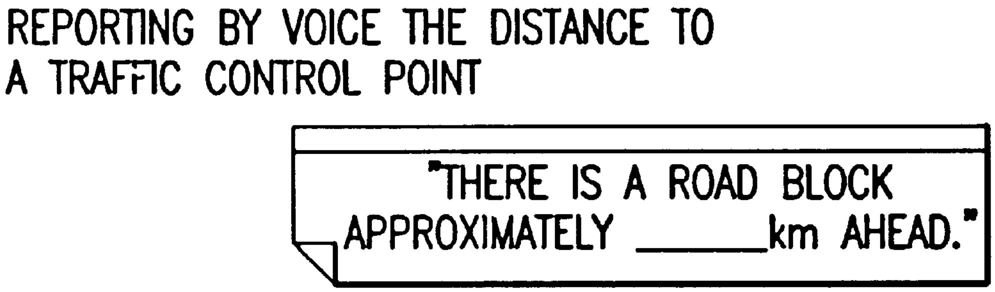
Figure 20D:
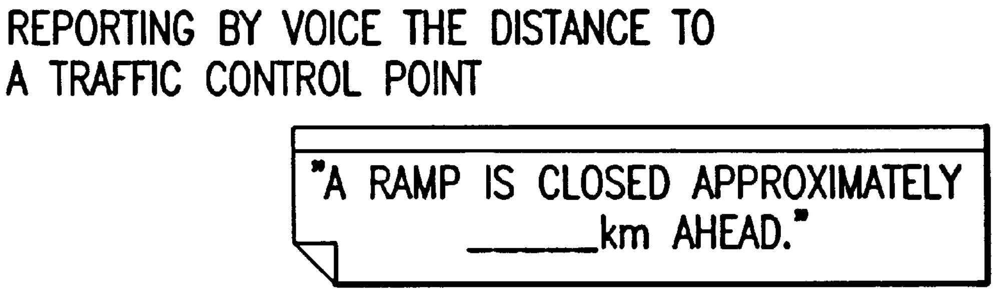
Figure 20E:
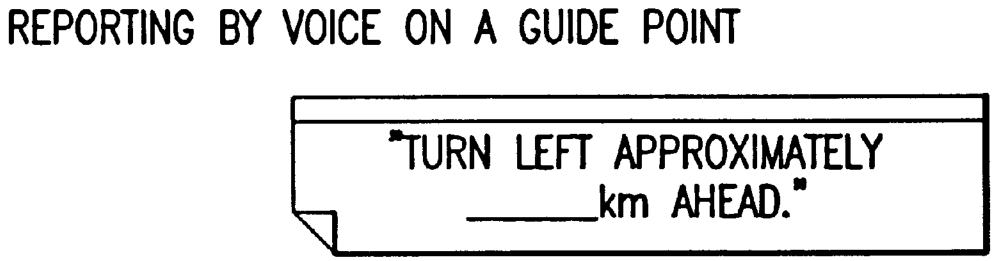

The distance from the current position to a traffic jam location and the length of the traffic jam are reported by voice as shown in FIG. 20A, the distance from the current position to the front end of the traffic jam is reported by voice as shown in FIG. 20B when the current position is within a traffic jam location, the distance from the current position to a traffic control point is reported by voice as shown in FIG. 20C, the distance from the current position to a location where an access ramp is closed is reported by voice as shown in FIG. 20D and the direction of the course at a guide point is reported by voice as shown in FIG. 20E.

In the embodiment described above, the information on traffic jam locations and traffic control points is reported by voice in the following manner.

(1) A recommended route is set, and the recommended route data table (FIG. 5) and the guide point table (FIG. 6) are prepared.

(2) Traffic jam information and traffic control information are received as VICS information with the FM multiplex receiver, and the traffic jam information provision table (FIG. 7) and the traffic control information provision table (FIG. 8) are prepared.

(3) If there are links in the traffic jam information provision table and the traffic control information provision table that share the same mesh numbers and the same link numbers with any of the individual links in the recommended route data table, the traffic jam information and the traffic control information belonging to these links are stored in the recommended route data table.

(4) The distances from the link start points to the tail end of a traffic jam location and the distance from the link start points to a traffic control point stored in the recommended route data table are converted to the distances from the start point of the route, and in correspondence to the converted distances, the length of the traffic jam, the traffic jam data classification, the distance from the start point of the recommended route to the traffic control point and the traffic control data classification are stored to prepare the traffic jam/traffic control data table (FIG. 9).

(5) When the voice request switch is operated, course guidance in regard to the course to be taken at the guide point nearest the current position is output by voice and following this, the distance to the traffic jam location and the distance to the traffic control point are output by voice.

(6) Every time the vehicle has traveled a specific distance, a decision is made as to whether or not the conditions for performing a voice output on the traffic jam location and the traffic control point are satisfied, and if the voice output conditions are satisfied, the voice report flag is turned on, whereas if the conditions are not satisfied, the voice report flag is turned off. If the voice report flag is on and the vehicle is positioned within the traffic jam location, the distance from the current position to the front end of the traffic jam location is output by voice. If the voice report flag is on and the vehicle is positioned at a location preceding the traffic jam location, the distance to the tail end of the traffic jam location is output by voice. If the voice report flag is turned off, no voice output is performed.

(7) The voice report flag is turned on in the following situations to output the distances to a traffic jam location and to a traffic control point by voice.

1. When traffic jam information or traffic control information has been received for the first time.

2. After providing a voice report on traffic jam information, voice output is prohibited until the following conditions: a, b, c, d and e are all satisfied (until an affirmative decision is made in step S363, 364 or 365 in FIGS. 17A, 17B and affirmative decisions are made in the subsequent steps S367, 368, 369 and 370).

a: The previously reported distance to the tail end of a traffic jam was equal to or greater than 50 km and the newly calculated distance to the same traffic jam location is less than 50 km;

the previously reported distance to the tail end of the jam was equal to or greater than 10 km and the newly calculated distance to the tail end of the same traffic jam location is less than 10 km; or the previously reported distance to the tail end of the jam was equal to or greater than 2 km and the newly calculated distance to tail end of the same traffic jam location is less than 2 km;

b: there is a difference of 2 km or more between the distance to the tail end of the traffic jam location previously reported by voice and the newly calculated distance to the tail end of the same traffic jam;

c: 5 km or more has been travelled since the previous voice report;

d: 10 minutes or more have elapsed since the previous voice report; and e: the traffic jam location is at or within 100 km of the current position.

3. After providing a voice report on traffic control point information, voice output is prohibited until the following conditions, a, b, c and d are all satisfied (until an affirmative decision is made in step S412, 413 or 414 in FIGS. 18A, 18B and affirmative decisions are made in the subsequent steps S416, 417 and 418).

a: The previously reported distance to the traffic control point was equal to or greater than 50 km and the newly calculated distance to the same traffic control point is less than 50 km;

the previously reported distance to the traffic control point was equal to or greater than 10 km and the newly calculated distance to the same traffic control point is less than 10 km; or the previously reported distance to the traffic control point was equal to or greater than 2 km and the newly calculated distance to the same traffic control point is less than 2 km;

b: there is a difference of 2 km or more between the distance to the traffic control point previously reported by voice and the newly calculated distance to the same traffic control point;

c: 5 km or more has been travelled since the previous voice report; and d: 10 minutes or more have elapsed since the previous voice report.

4. Following a voice report on a traffic jam location, when another traffic jam other than the first traffic jam location occurs at a point close to the vehicle position and the tail ends of the two traffic jam locations are distanced from each other by 10 km or more, the distance to the tail end of the traffic jam location is reported again even if condition (a) above is not satisfied as long as conditions (b), (c), (d) and (e) are satisfied (when negative decisions are made in steps S363, 364 and 365 in FIGS. 17A, 17B and affirmative decisions are made in the subsequent steps S366, 367, 368, 369 and 370).

5. Following a voice report of traffic control information, when a new traffic control is implemented at a point close to the vehicle position other than the first traffic control point and if these two traffic control points are distanced from each other by 10 km or more, the distance to the traffic control point is reported again even if condition (a) above is not satisfied as long as conditions (b), (c) and (d) are satisfied (until negative decisions are made in steps S412, 413 and 414 in FIGS. 18A, 18B and affirmative decisions are made in the subsequent steps S415, 416, 417 and 418).

6. If there is a traffic control point preceding a traffic jam location, the distance to the traffic jam location is not output by voice (step S361 in FIG. 17A).

(8) If there is a traffic jam location and a traffic control point present independent of each other, voice output is performed successively.

While, in the explanation given above, a voice report is issued only on the traffic jam location that is nearest the current position even when a plurality of traffic jam locations are present, if there are a plurality of traffic jam locations, voice reports may be issued on all of them, or voice reports may be performed on a plurality of traffic jam locations that satisfy specific requirements. FIGS. 21A, 21B 22A and 22B show examples of a flowchart of the interrupt processing performed at intervals of a specific distance traveled and a flowchart of the condition check processing for voice reporting on traffic jam locations that is performed in such cases.

Figure 21A:
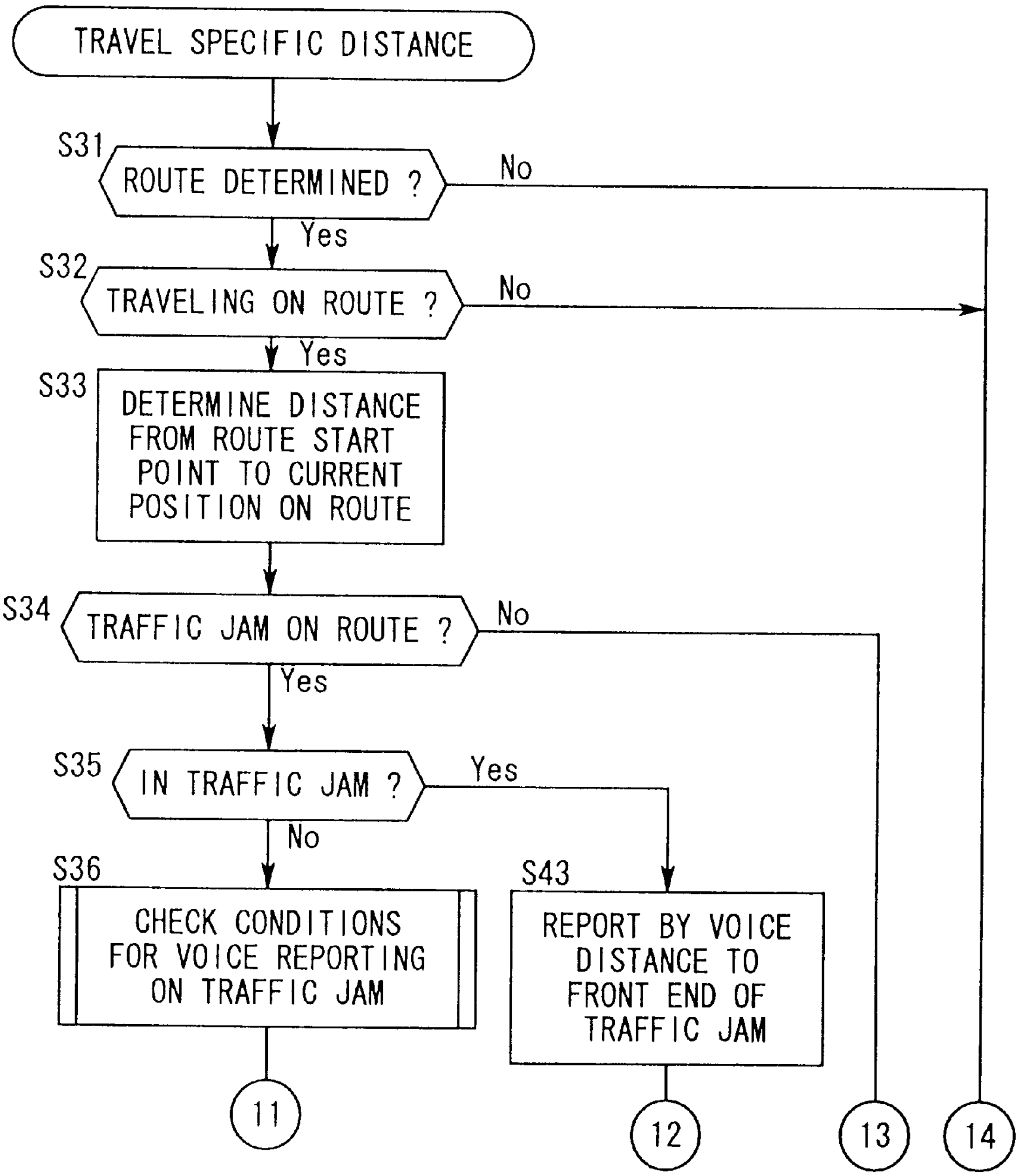
FIG. 21A and 21B are flowcharts of the processing executed every time the vehicle has traveled a specific distance in order to report by voice a plurality of traffic jam locations.
Figure 21B:
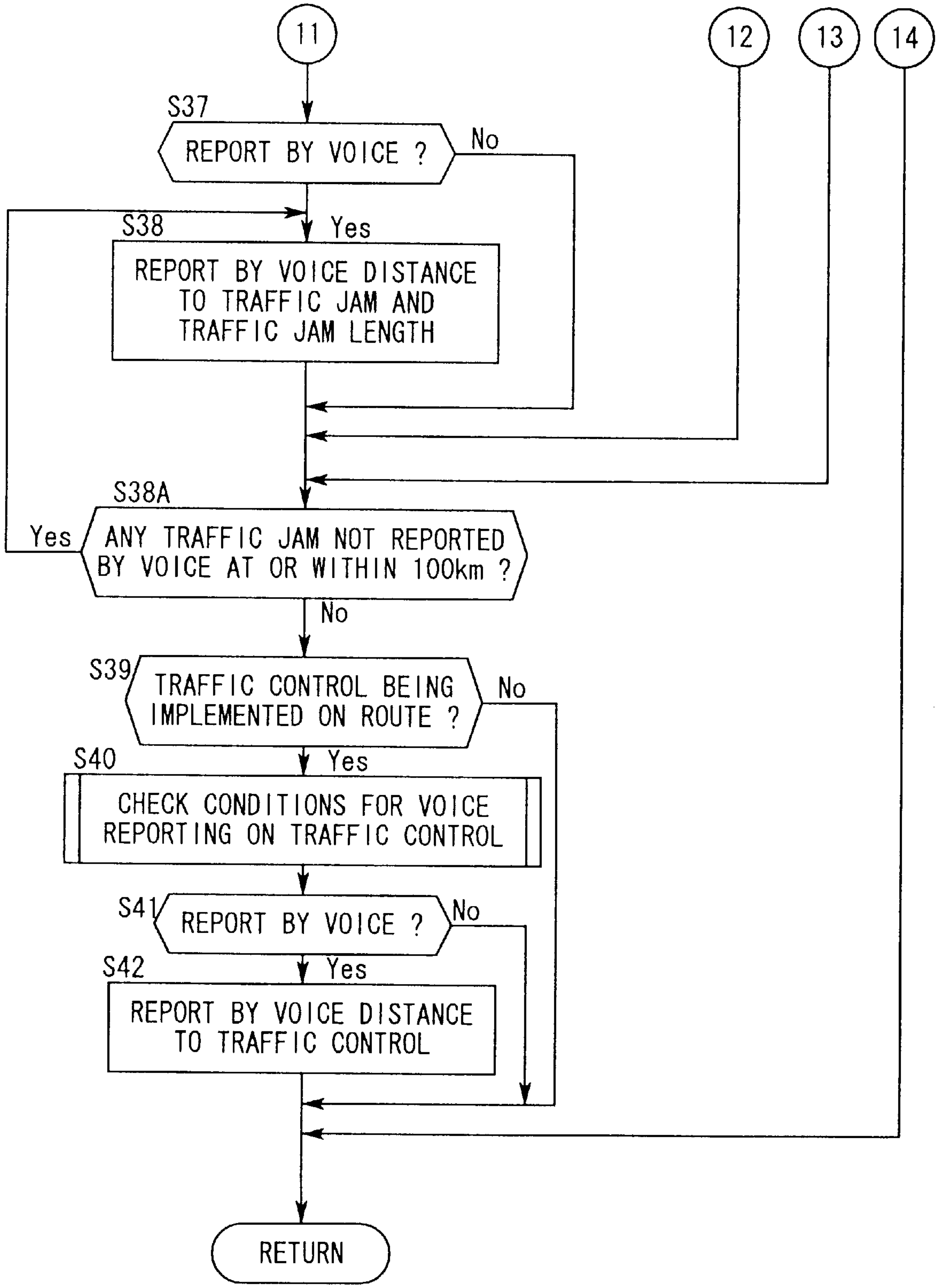

FIGS. 21A and 21B, which correspond to FIG. 16, are flowcharts of the processing that is executed every time the vehicle covers a distance of 10 m. The difference from the processing shown in FIG. 16 is the decision making performed in step S38A. In step S38A, a decision is made as to whether or not there is a traffic jam location present at or within 100 km from the current position for which a voice report has not yet been issued and if there is one, the operation returns to step S38, in which the distance to the tail end of the traffic jam location and the length of the traffic jam are reported by voice. Thus, a voice report is issued on every traffic jam location that is present at or within 100 km. By setting the distance at a large value such as 2000 km instead of 100 km, all traffic jam information can be reported by voice.

Figure 22A:
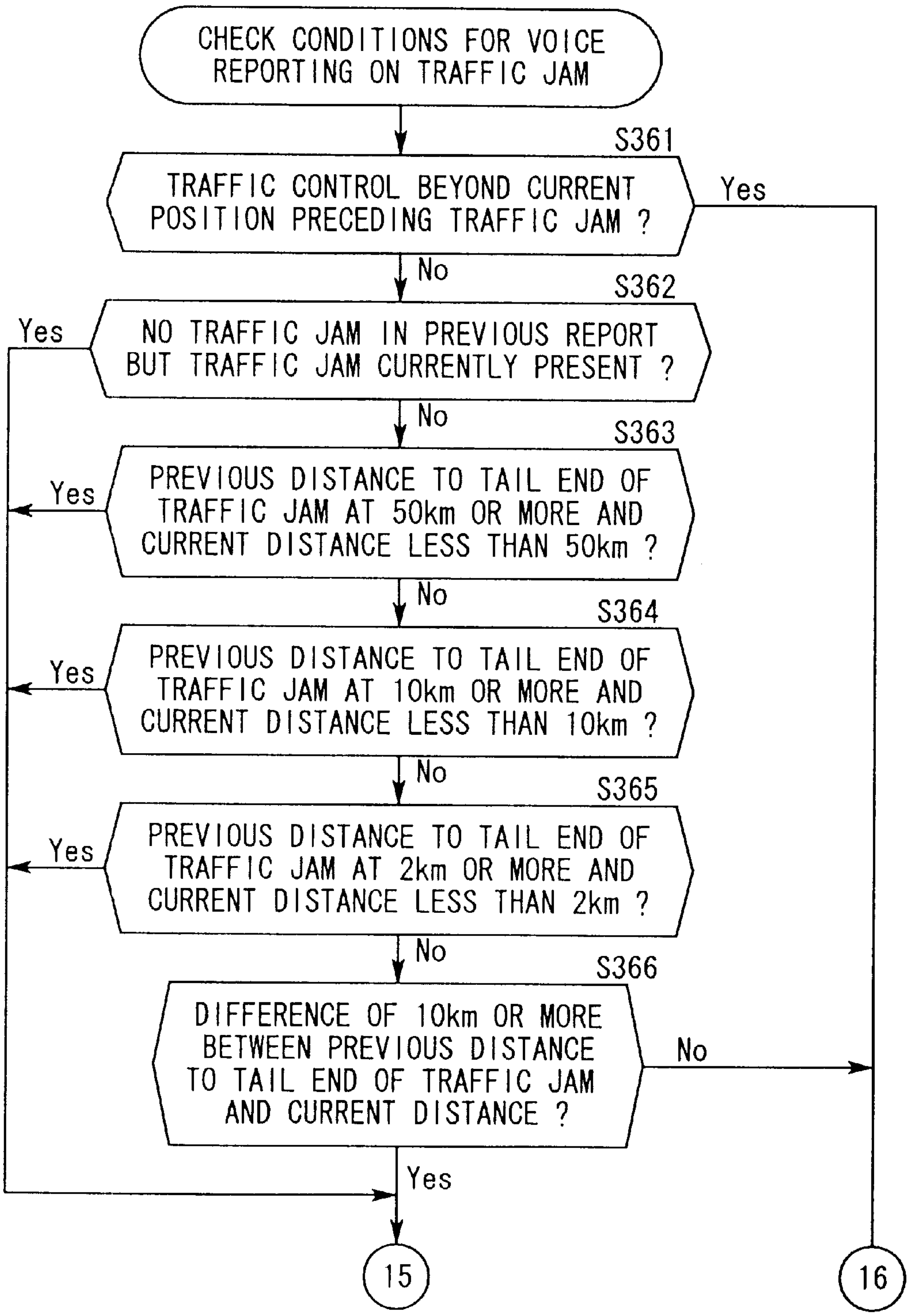
FIG. 22A and 22B are flowcharts illustrating the condition check processing for voice reporting on traffic jams in order to report by voice a plurality of traffic jam locations.
Figure 22B:
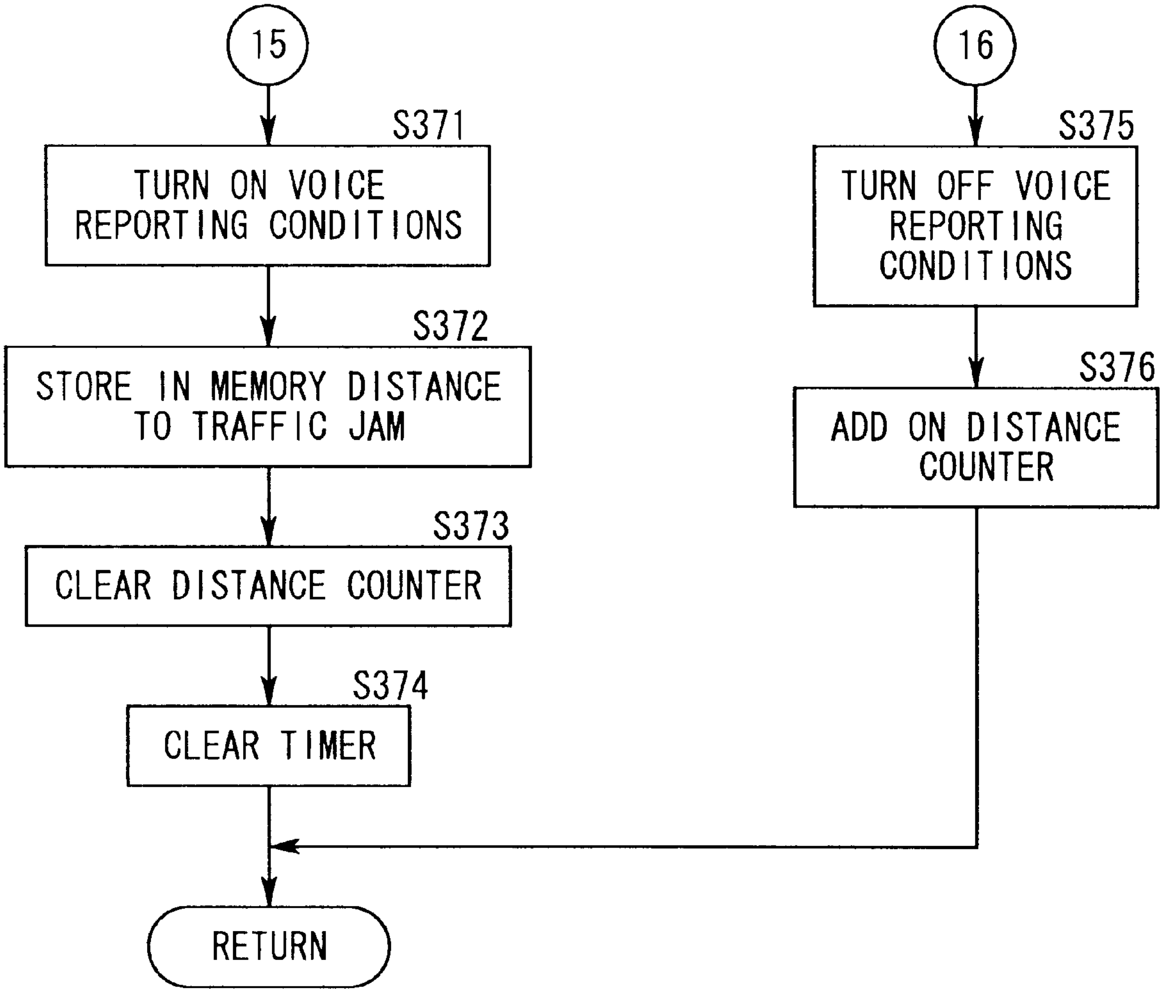

FIGS. 22A and 22B, which correspond to FIGS. 17A and 17B, are flowcharts of the condition check processing for voice reporting of traffic jam information. The difference from the processing shown in FIGS. 17A and 17B are that the decision making performed in steps S367–370 for preventing voice output that may be irritating is omitted. In other words, voice output is performed in conformance to the decisions made in regard to the voice output conditions performed in steps S361–366, whereas if the conditions are not satisfied, no voice output is performed.

While the invention has been described herein with respect to a navigation system, the system functions can likewise be performed under software control. In that regard, the invention may be performed by a general purpose computer or processor programmed to perform the described functions. Of course, the invention may be performed using a combination of the programmed processor and custom hardware components. The programs for performing the system functions are storable on a computer readable medium. The computer readable medium having the programs stored thereon for performing the described system functions can be operable with an appropriate processor.

What is claimed is:

1. A computer program product comprising a computer readable medium having stored thereon a navigation system program which processes a route setting to a destination, a current position, traffic information from outside, and outputs by voice a distance from said current position to a traffic jam or a traffic control point;

wherein when said traffic information received from outside indicates that there are a plurality of traffic jams or traffic control points, said program causes said outputs by voice to output a distance to a traffic jam or traffic control point location that is nearest said current position.

2. A computer program product comprising a computer readable medium having stored thereon a navigation system program which includes code segments that:

set a route to a destination and provide course guidance at guide points;

detect a current position;

receive traffic information from outside;

determine whether an operating member is activated in order to provide said course guidance by voice; and provide said course guidance when said determining step indicates said operating member is activated and, if said traffic information received from outside indicates that there is a traffic jam location on said route that has been set, calculate a distance from said current position detected by said detecting step to said traffic jam location and issue voice reports thereupon following said course guidance which was provided.

3. A computer program product comprising a computer readable medium having stored thereon a navigation system program which includes code segments that:

set a route to a destination;

detect a current position;

receive traffic information from outside; and calculate distances from said current position detected by said detecting step to a traffic control point and a traffic jam location and issue successive voice reports thereupon when said traffic information received from outside indicates that the traffic control point and the traffic jam location are present on the route that has been set.

4. A computer program product comprising a computer readable medium having stored thereon a navigation system program which includes code segments that:

set a route to a destination;

detect a current position;

receive traffic information from outside; and when said traffic information received from outside indicates that a traffic control point and a traffic jam location are present on said route that has been set, inhibit a voice report on a traffic jam location situated beyond said traffic control point but calculate a distance from a traffic jam location preceding said traffic control point to said current position and issue a voice report thereupon.

5. A computer program product comprising a computer readable medium having stored thereon a navigation system program which includes code segments that:

set a route to a destination;

detect a current position;

receive traffic information from outside;

output by voice a distance from said current position to a traffic jam or a traffic control point; and cause said output step to output distances to traffic jam or traffic control point locations that are a specific distance from said current position when traffic information received from outside indicates that there are traffic jams or traffic control points on said route that has been set.

6. A computer program product comprising a computer readable medium having stored thereon a navigation system program which includes code segments that:

set a route to a destination;

determine a current position;

receive traffic information from outside;

output by voice a distance from said current position to a traffic jam or a traffic control point; and cause said output step to output a distance to a traffic jam or traffic control point location that is nearest said current position when said traffic information received from outside indicates that there are a plurality of traffic jams or traffic control points.

7. A navigation system comprising:

a means for route setting that sets a route to a destination;

a position detection device that detects a current position;

a reception device that receives traffic information from outside; and a reporting device that, when said traffic information received by said reception device indicates that there is a traffic jam location on said route that has been set, calculates a distance from said current position detected by said detection device to said traffic jam location and issues a voice report thereupon, and once said voice report on a first traffic jam location is issued, if a second traffic jam location occurs at a point preceding said first traffic jam location by a distance equal to or greater than a specific distance from a tail end of said first traffic jam location, issues a voice report on a distance from said current position to said second traffic jam location.

8. A navigation system comprising:

a means for route setting that sets a route to a destination and course guidance to be provided at guide points;

a position detection device that detects a current position;

a reception device that receives traffic information from outside;

an operating member that is operated in order to provide said course guidance by voice; and a reporting device that provides said course guidance when said operating member is operated and if, said traffic information received by said reception device indicates that there is a traffic jam location on said route that has been set, following said course guidance thus provided calculates a distance from said current position detected by said detection device to said traffic jam location and issues a voice report thereupon.

9. A navigation system comprising:

a means for route setting that sets a route to a destination;

a position detection device that detects a current position;

a reception device that receives traffic information from outside; and a reporting device that, when said traffic information received by said reception device indicates that a traffic control point and a traffic jam location are present on said route that has been set, calculates distances from said current position detected by said detection device to said traffic control point and to said traffic jam location and issues successive voice reports thereupon.

10. A navigation system comprising:

a means for route setting that sets a route to a destination;

a position detection device that detects a current position;

a reception device that receives traffic information from outside, and a reporting device that, when said traffic information received by said reception device indicates that a traffic control point and a traffic jam location are present on said route that has been set, does not issue a voice report on a traffic jam location situated beyond said traffic control point but calculates a distance from a traffic jam location preceding said traffic control point to said current position and issues a voice report thereupon.

11. A navigation system comprising:

a means for route setting that sets a route to a destination;

a position detection device that detects a current position;

a reception device that receives traffic information from outside;

a reporting device that, when said traffic information received by said reception device indicates that there is a traffic jam location on said route that has been set, calculates a distance from said current position detected by said detection device to said traffic jam location and issues a voice report thereupon;

a means for time calculation that calculates a length of time elapsed from a point at which said reporting device reports on a traffic jam location; and a means for prohibition that, once said reporting device reports on a traffic jam location, prohibits operation of said reporting device until said length of time that has been calculated is equal to or greater than a specific value.

12. A navigation system comprising:

a means for route setting that sets a route to a destination;

a position detection device that detects a current position;

a reception device that receives traffic information from outside;

a reporting device that, when said traffic information received by said reception device indicates that there is a traffic jam location on said route that has been set, calculates a distance from said current position detected by said detection device to said traffic jam location and issues a voice report thereupon;

a means for distance calculation that calculates a travelling distance from a point at which said reporting device reports on a traffic jam location; and a means for prohibition that, once said reporting device reports on a traffic jam location, prohibits operation of said reporting device until said travelling distance that has been calculated is equal to or greater than a specific value.

13. A navigation system comprising:

a means for route setting that sets a route to a destination;

a position detection device that detects a current position;

a reception device that receives traffic information from outside;

a voice output device that outputs by voice a distance from said current position to a traffic jam or a traffic control point; and a control circuit that, when said traffic information received by said reception device indicates that there are a plurality of traffic jams or traffic control points, causes said voice output device to output all distances from said current position to said plurality of locations.

14. A navigation system comprising:

a means for route setting that sets a route to a destination;

a position detection device that detects a current position;

a reception device that receives traffic information from outside;

a voice output device that outputs by voice a distance from said current position to a traffic jam or a traffic control point; and a control circuit that, when said traffic information received by said reception device indicates that there are a plurality of traffic jams or traffic control points, causes said voice output device to output a distance to a traffic jam or traffic control point location that is nearest said current position.

15. A navigation system according to claim 1, wherein:

said reporting device also reports on a length of said traffic jam.

16. A navigation system comprising:

a means for route setting that sets a route to a destination;

a position detection device that detects a current position;

a reception device that receives traffic information from outside;

a voice output device that outputs by voice a distance from said current position to a traffic jam or a traffic control point; and a control circuit that, when traffic information received by said reception device indicates that there are traffic jams or traffic control points on said route that has been set, causes said voice output device to output distances to traffic jam or traffic control point locations that are a specific distance from said current position.

17. A navigation system according to claim 16, wherein:

when said reception device first receives information on a traffic jam location, said reporting device reports on said distance to said traffic jam location regardless of how great said distance is from said current position to said traffic jam location.

18. A navigation system comprising:

a means for route setting that sets a route to a destination;

a position detection device that detects a current position;

a reception device that receives traffic information from outside;

a reporting device that, when said traffic information received by said reception device indicates that there is a traffic jam location on said route that has been set, calculates a distance from said current position detected by said detection device to said traffic jam location and issues a voice report thereupon; and a means for prohibition that, once said reporting device reports on a traffic jam location, if said distance from said current position to a tail end of said traffic jam location that has been previously reported is equal to or greater than a first specific value, prohibits reporting on said traffic jam location until said distance becomes reduced to less than said first specific value.

19. A navigation system according to claim 18, wherein:

even when said distance has become reduced to less than said first specific value, said means for prohibition prohibits current reporting on said traffic jam location if there is a difference that is less than a second specific value between said distance to said traffic jam location that has been previously reported and a distance to said traffic jam location in currently received information.

* * * * *